United States Patent
Ego et al.

(10) Patent No.: US 10,634,976 B2
(45) Date of Patent: Apr. 28, 2020

(54) IMAGING DEVICE

(71) Applicant: FUJIFILM Corporation, Tokyo (JP)

(72) Inventors: Shunta Ego, Saitama (JP); Satoru Wakabayashi, Saitama (JP); Yuji Hasegawa, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/198,894

(22) Filed: Nov. 23, 2018

(65) Prior Publication Data

US 2019/0094655 A1    Mar. 28, 2019

Related U.S. Application Data

(63) Continuation of application No. PCT/JP2017/018974, filed on May 22, 2017.

(30) Foreign Application Priority Data

May 26, 2016    (JP) .................................. 2016-105159

(51) Int. Cl.
*G03B 13/06*    (2006.01)
*G03B 13/10*    (2006.01)
(Continued)

(52) U.S. Cl.
CPC ............. *G03B 13/06* (2013.01); *G03B 13/10* (2013.01); *G03B 17/02* (2013.01); *G03B 17/20* (2013.01);
(Continued)

(58) Field of Classification Search
CPC .................................................... G03B 13/06
See application file for complete search history.

(56) References Cited

U.S. PATENT DOCUMENTS

| 5,606,390 A | 2/1997 | Arai et al. |
| 7,860,389 B2 * | 12/2010 | Hara ...................... G03B 17/18 348/333.01 |

(Continued)

FOREIGN PATENT DOCUMENTS

| JP | H05183800 | 7/1993 |
| JP | 2000010155 | 1/2000 |

(Continued)

OTHER PUBLICATIONS

"International Search Report (Form PCT/ISA/210)" of PCT/JP2017/018974, dated Aug. 1, 2017, with English translation thereof, pp. 1-3.

(Continued)

*Primary Examiner* — Clayton E. LaBalle
*Assistant Examiner* — Dennis Hancock
(74) *Attorney, Agent, or Firm* — JCIPRNET

(57) ABSTRACT

A camera body includes a mount, a solid-state imaging element, a body control unit, a diopter value detection unit, a number-of-configurations storage unit, a rear display unit, and a finder unit. An interchangeable lens is attached to the mount. The body control unit counts the number of configurations by the diopter adjustment dial for each diopter value of the finder unit configured by the diopter adjustment dial and stores the number of configurations in the number-of-configurations storage unit. In a case where the diopter value of the finder unit has been configured by the diopter adjustment dial, the body control unit changes a configuration screen to be displayed on the rear display unit according to the number of configurations stored in the number-of-configurations storage unit.

11 Claims, 16 Drawing Sheets

(51) Int. Cl.
  *G03B 17/20* (2006.01)
  *H04N 5/232* (2006.01)
  *G03B 17/02* (2006.01)
  *H04N 5/225* (2006.01)
(52) U.S. Cl.
  CPC ....... *H04N 5/2252* (2013.01); *H04N 5/22525* (2018.08); *H04N 5/232* (2013.01); *H04N 5/232939* (2018.08)

(56) References Cited

U.S. PATENT DOCUMENTS

| | | | | |
|---|---|---|---|---|
| 2005/0098706 | A1* | 5/2005 | Mogamiya | G02B 7/08 |
| | | | | 250/201.2 |
| 2017/0054914 | A1* | 2/2017 | Sato | G03B 13/06 |
| 2018/0047369 | A1* | 2/2018 | Zhao | G02B 27/01 |
| 2018/0052331 | A1* | 2/2018 | Inaba | G03B 35/18 |

FOREIGN PATENT DOCUMENTS

| | | |
|---|---|---|
| JP | 2003344929 | 12/2003 |
| JP | 2008164765 | 7/2008 |
| JP | 2010226193 | 10/2010 |
| WO | 2008078539 | 7/2008 |

OTHER PUBLICATIONS

"Written Opinion of the International Searching Authority (Form PCT/ISA/237)" of PCT/JP2017/018974, dated Aug. 1, 2017, with English translation thereof, pp. 1-7.

* cited by examiner

FIG. 16

| DIOPTER VALUE | FREQUENCY OF USE |
|---|---|
| +5 | 80% |
| 0 | 20% |

OK    RESET

FIG. 17

| DIOPTER VALUE | USAGE TIME |
|---|---|
| +5 | 10h28m |
| 0 | 3h10m |

OK    RESET

IMAGING DEVICE

CROSS-REFERENCE TO RELATED APPLICATIONS

This application is a Continuation of PCT International Application No. PCT/JP2017/018974 filed on 22 May 2017, which claims priority under 35 U.S.C § 119(a) to Japanese Patent Application No. 2016-105159 filed on 26 May 2016. The above application is hereby expressly incorporated by reference, in its entirety, into the present application.

BACKGROUND OF THE INVENTION

1. Field of the Invention

The present invention relates to an imaging device having a finder unit of which a diopter value is variable.

2. Description of the Related Art

An imaging device such as a digital camera has various imaging functions in order to capture high quality images. In such an imaging device, it is general that a configuration screen is displayed on a display unit and the imaging functions can be configured on the basis of the configuration screen.

A digital camera generally includes a finder unit for confirming a subject image through looking into the finder unit, in addition to a rear display unit provided on a rear surface of a camera body for displaying a configuration screen or the like. An electronic viewfinder or a hybrid viewfinder is known as the finder unit. The hybrid viewfinder has an optical finder mode and an electronic viewfinder mode, and can be switched therebetween.

On the other hand, an imaging device including a diopter configuration manipulation unit that enables a diopter value configuration manipulation, in which a diopter value of a finder unit is varied according to eyesight of a photographer. JP2003-344929A and JP2010-226193A disclose an imaging device in which a photographer adjusts a diopter configuration manipulation unit so that a diopter adjustment lens is moved and a diopter value of a finder unit is varied. In this imaging device, in a case where the diopter value of the finder unit configured by the diopter configuration manipulation unit is on the hyperopia side, a display size of an image or characters to be displayed on a rear display unit is increased.

SUMMARY OF THE INVENTION

However, in the imaging device described in JP2003-344929A and JP2010-226193A above, in a case where the finder unit is configured to a diopter value that does not match eyesight of the photographer, the display content of the rear display unit may not match the eyesight of the photographer. In particular, in a case where the eyesight of the photographer is not hyperopia and the diopter value of the finder unit configured by the diopter configuration manipulation unit is configured to the hyperopia side, the image or characters are displayed with a display size on the display unit in the imaging device described in JP2003-344929A and JP2010-226193A. Thus, it is difficult for the photographer to view the image or characters and the use is not good.

An object of the present invention is to provide an imaging device capable of appropriately changing display content of a configuration screen according to eyesight of a photographer.

An imaging device according to the present invention includes an imaging unit, a finder unit, a diopter configuration manipulation unit, a number-of-configurations storage unit, a display unit, and a configuration screen changing unit. When the imaging unit captures a subject image, the finder unit enables observation of the subject image and has a variable diopter value. The diopter configuration manipulation unit enables a configuration manipulation of the diopter value. The number-of-configurations storage unit counts and stores the number of configurations by the diopter configuration manipulation unit for each diopter value configured by the diopter configuration manipulation unit. The display unit displays a configuration screen enabling a configuration of an imaging function of the imaging unit. The configuration screen changing unit changes the configuration screen according to the number of configurations stored in the number-of-configurations storage unit in a case where the diopter value has been configured by the diopter configuration manipulation unit.

It is preferable for the imaging device to further include a configuration frequency calculation unit that calculates a configuration frequency indicating the number of configurations with respect to a time on the basis of the number of configurations stored in the number-of-configurations storage unit, and it is preferable for the configuration screen changing unit to change the configuration screen in a case where the diopter value is configured by the diopter configuration manipulation unit and the configuration frequency calculated by the configuration frequency calculation unit is smaller than a predetermined value.

It is preferable for the configuration screen changing unit to erase a display of the configuration screen by the display unit in a case where the diopter value configured by the diopter configuration manipulation unit is in a specific range in which the diopter value is equal to or greater than +4 diopters in a range configurable by the diopter configuration manipulation unit and a case where the configuration frequency is smaller than the predetermined value.

It is preferable for the imaging device to further include a sound guidance unit that guides an imaging function of the imaging unit using sound, and it is preferable for the configuration screen changing unit to cause the sound guidance unit to function in a case where the diopter value configured by the diopter configuration manipulation unit is in the specific range and the configuration frequency is smaller than a predetermined value.

It is preferable for the configuration screen changing unit to display information to be displayed as the configuration screen with a smaller number of characters than that before the change and to be larger than that before the change in a case where the diopter value configured by the diopter configuration manipulation unit is in a specific range in which the diopter value is equal to or greater than +4 diopters in a range configurable by the diopter configuration manipulation unit and a case where the configuration frequency is smaller than the predetermined value.

It is preferable for the configuration screen changing unit to change the content to be displayed as the configuration screen from text information to icons in a case where the diopter value configured by the diopter configuration manipulation unit is in a specific range in which the diopter value is equal to or greater than +4 diopters in a range configurable by the diopter configuration manipulation unit and a case where the configuration frequency is smaller than the predetermined value.

It is preferable for the configuration screen changing unit to change the content to be displayed as the configuration screen from text information on filter processing to be performed on a captured image of the imaging unit to a display of a sample image corresponding to the filter processing in a case where the diopter value configured by the diopter configuration manipulation unit is in a specific range in which the diopter value is equal to or greater than +4 diopters in a range configurable by the diopter configuration manipulation unit and a case where the configuration frequency is smaller than the predetermined value.

It is preferable for the configuration screen changing unit to enlarge and display a configuration item and a configuration value configured on the basis of the configuration screen as compared with those before the change in a case where the diopter value configured by the diopter configuration manipulation unit is in a specific range in which the diopter value is equal to or greater than +4 diopters in a range configurable by the diopter configuration manipulation unit and a case where the configuration frequency is smaller than the predetermined value.

It is preferable for the configuration screen changing unit to cause a display for prompting attention to be displayed in a case where an operation input corresponding to an imaging function different from the imaging function configured on the basis of the configuration screen is performed in a case where the diopter value configured by the diopter configuration manipulation unit is in the specific range and the configuration frequency is smaller than a predetermined value.

It is preferable for the configuration screen changing unit to cause a subject image captured by the imaging unit to be displayed on the display unit and causes an outline of a focused portion in the subject image to be displayed thickly with respect to an outline of a non-focused portion in a case where a manual focus manipulation is performed in a case where the diopter value configured by the diopter configuration manipulation unit is in the specific range and the configuration frequency is smaller than the predetermined value.

It is preferable the display unit to display a confirmation screen for confirming a plurality of diopter values configured by the diopter configuration manipulation unit and a use frequency based on the number of configurations for each of the diopter values.

According to the present invention, it is possible to appropriately change the display content of the configuration screen according to eyesight of a photographer.

BRIEF DESCRIPTION OF THE DRAWINGS

FIG. 16 is an illustrative diagram illustrating an example in which a confirmation screen is displayed in an eighth embodiment.

FIG. 17 is an illustrative diagram illustrating another example in which the confirmation screen is displayed in the eighth embodiment.

DESCRIPTION OF THE PREFERRED EMBODIMENTS

First Embodiment

Figure 1:
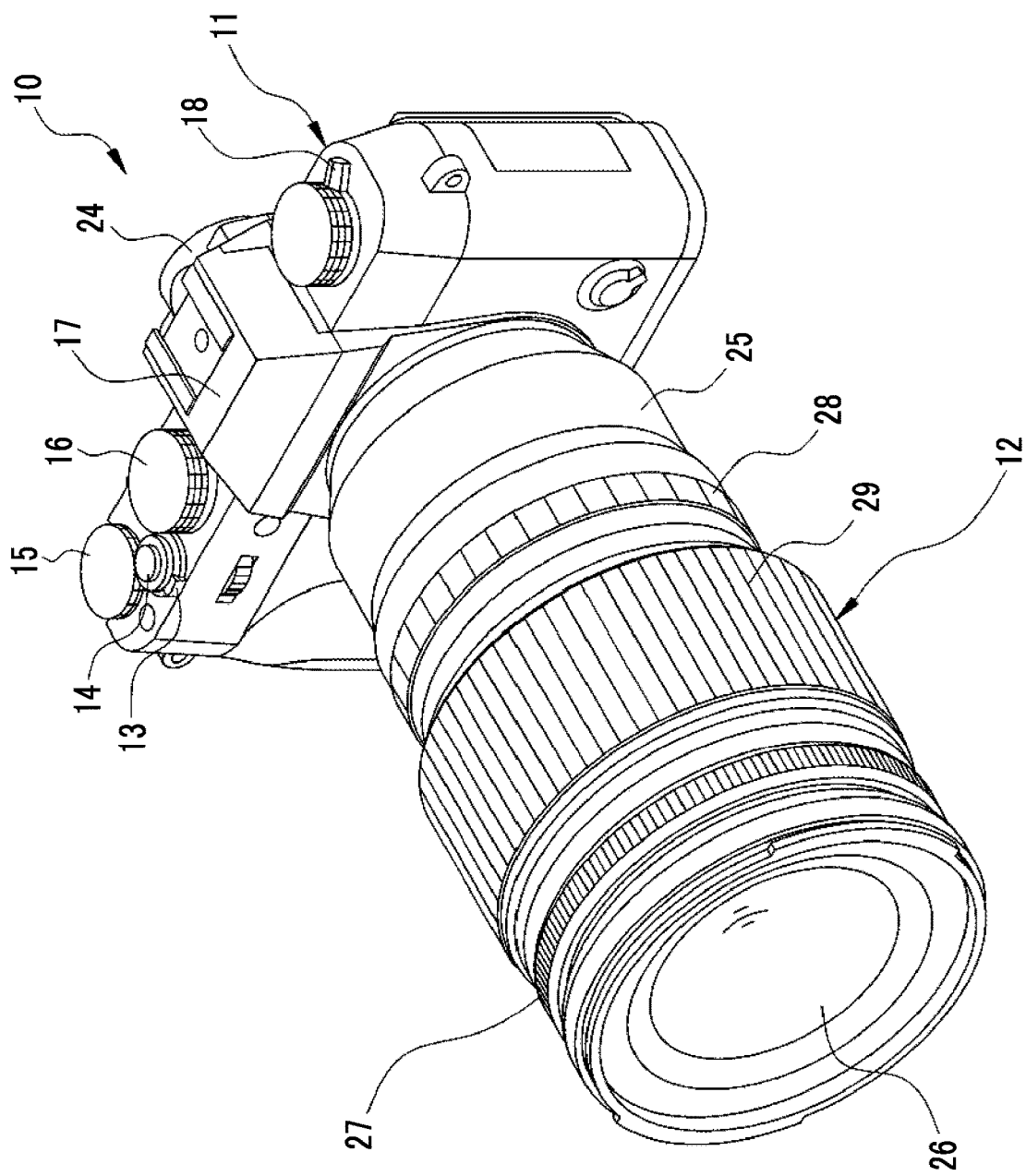
FIG. 1 is a front perspective view of a lens interchangeable type digital camera.
Figure 2:
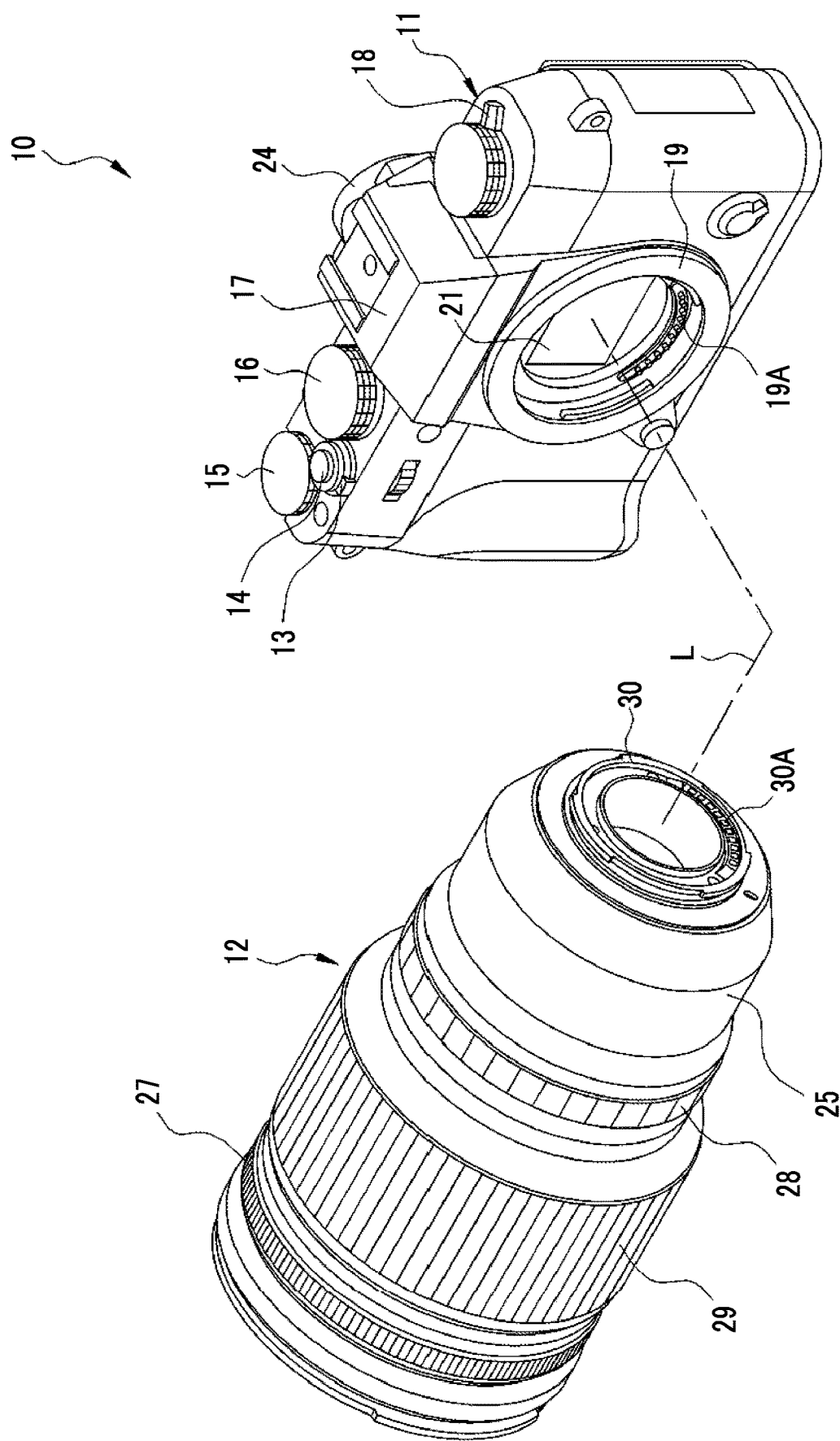
FIG. 2 is an external perspective view of an interchangeable lens and a camera body.

In FIGS. 1 and 2, a lens interchangeable type digital camera (hereinafter referred to as a camera) 10 includes a camera body 11 and an interchangeable lens 12. The camera 10 is a so-called mirrorless single lens type digital camera.

The camera body 11 includes, for example, a power supply lever 13, a release switch 14, an exposure correction dial 15, a shutter speed/ISO sensitivity dial 16, and a built-in flash device 17, which are provided on an upper surface.

The release switch 14 is a two-step stroke type switch that enables so-called "half pressing" and "full pressing". The release switch 14 outputs an S1 on signal according to half-pressing, and outputs an S2 on signal according to full-pressing which is further pressing after half-pressing. In a case where the S1 on signal is output from the release switch 14, the camera 10 executes an imaging preparation process such as automatic focus adjustment (AF (auto focus) process) or automatic exposure control, and in a case where the S2 on signal is output, the camera 10 executes an imaging process. The built-in flash device 17, for example, opens a cover to expose a light emitting unit according to a manipulation of a flash lever 18.

A mount 19 is provided on a front surface of the camera body 11. The interchangeable lens 12 is attached to the mount 19. A body side signal contact 19A for electrically connecting to the interchangeable lens 12 and a solid-state imaging element 21 are provided inside the mount 19.

Figure 3:
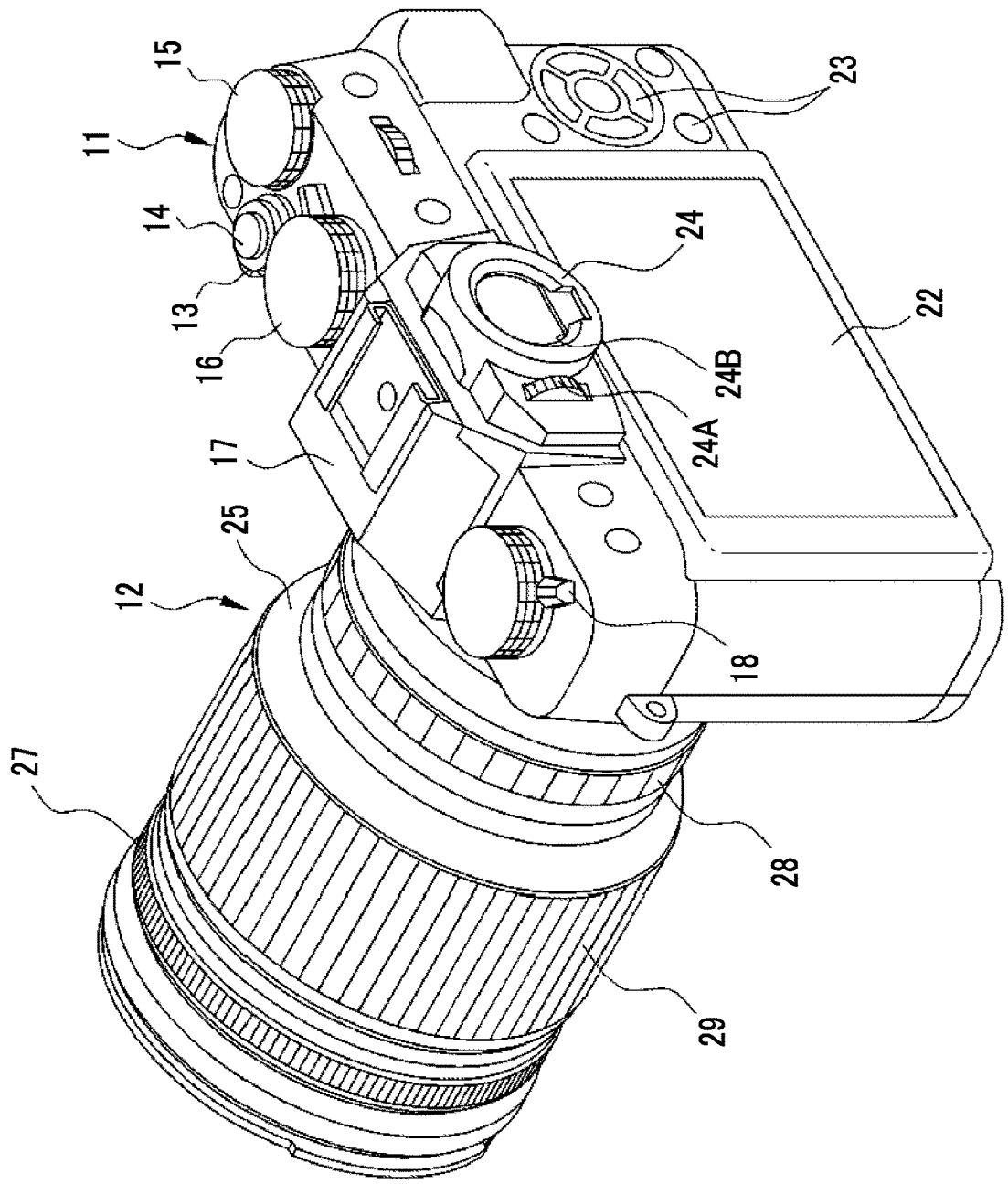
FIG. 3 is an external perspective view illustrating a rear appearance of the lens interchangeable type digital camera.

As illustrated in FIG. 3, a rear display unit 22, a plurality of manipulation buttons 23, a finder unit 24, and the like are provided on a back surface of the camera body 11. The rear display unit 22 corresponds to a display unit of the present invention, and is used for a display of a live view image, reproduction of a captured image, a display of a configuration screen, and the like. The plurality of manipulation buttons 23 are used for various configuration manipulations and the like. The rear display unit 22 includes, for example, an LCD panel.

The finder unit 24 is an electronic viewfinder. A live view image that is a subject image captured by the solid-state imaging element 21 is displayed on the electronic view finder (EVF) panel 61 (see FIG. 4) including an LCD disposed at the back of a finder eyepiece window 24B. An eye of the photographer contacts the finder eyepiece window 24B.

A photographer can observe a subject image displayed on the EVF panel 61 via the finder eyepiece window 24B. The finder unit 24 is provided with a diopter adjustment dial 24A. The diopter adjustment dial 24A is a diopter configuration manipulation unit that enables a diopter value configuration manipulation in the finder unit 24. The diopter adjustment dial 24A drives a diopter adjustment mechanism 64 to be described later to vary the diopter value of the finder unit 24.

As illustrated in FIG. 2, the interchangeable lens 12 includes, for example, a lens barrel portion 25, an imaging optical system 26, a focus ring 27, an aperture manipulation ring 28, a zoom ring 29, and a lens mount 30. The lens barrel portion 25 has a cylindrical shape, receives the imaging optical system 26 therein, and includes a lens mount 30 provided at a rear end. In a case where the interchangeable lens 12 is mounted on the camera body 11, the imaging optical system 26 forms subject light image on the solid-state imaging element 21. The solid-state imaging element 21 images light emitted from the interchangeable lens 12.

The lens mount 30 is detachably coupled to the mount 19 of the camera body 11. The lens mount 30 is provided with a lens side signal contact 30A. In a case where the lens mount 30 of the interchangeable lens 12 is coupled to the mount of the camera body 11, the lens side signal contact 30A contacts the body side signal contact 19A to electrically connect the interchangeable lens 12 to the camera body 11.

Figure 4:
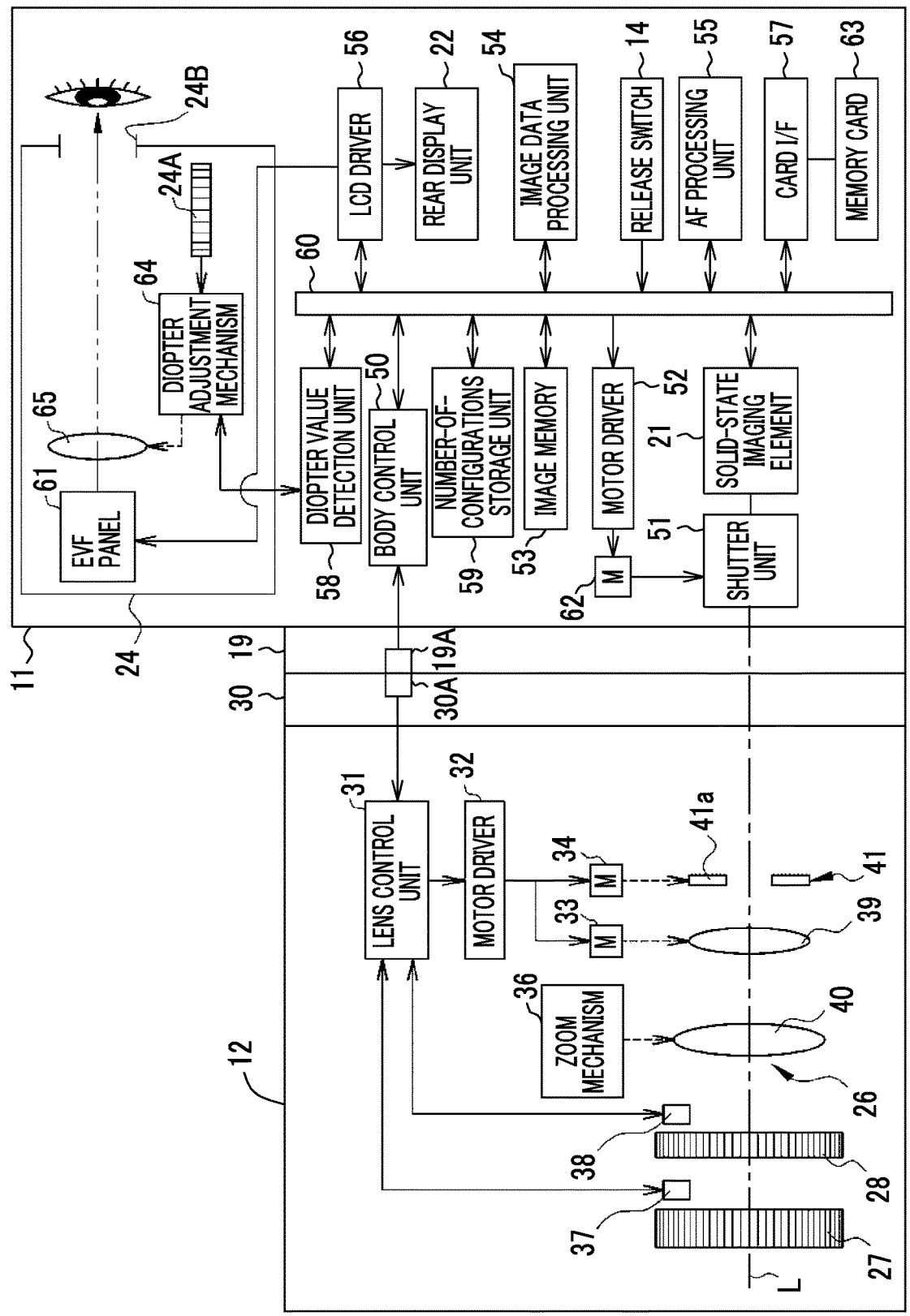
FIG. 4 is a block diagram illustrating a configuration of the lens interchangeable type digital camera.

As illustrated in FIG. 4, the interchangeable lens 12 includes, for example, a lens control unit 31, a motor driver 32, motors 33 and 34, a zoom mechanism 36, and sensors 37 and 38, in addition to the imaging optical system 26, the focus ring 27, the aperture manipulation ring 28, and the like.

The lens control unit 31 consists of a computer including, for example, a central processing unit (CPU), a read only memory (ROM) in which programs or parameters to be used by the CPU have been stored, a random access memory (RAM) (both not illustrated) to be used as a work memory for the CPU, and controls each unit of the interchangeable lens 12. The motor driver 32 and the sensors 37 and 38 are connected to the lens control unit 31.

The imaging optical system 26 includes, for example, a plurality of lenses including a focus lens 39 and a variable magnification lens 40, and an aperture unit 41. The focus lens 39 moves in a direction of the optical axis L according to driving of the motor 33 and adjusts an imaging distance. The aperture unit 41 moves a plurality of aperture blades 41a according to driving of the motor 34, and changes the amount of light incident on the solid-state imaging element 21. The motor driver 32 controls driving of the motors 33 and 34 under the control of the lens control unit 31.

The zoom mechanism 36 is a manual zoom mechanism that converts a rotational operation of the zoom ring 29 into a linear movement and moves the variable magnification lens 40. The variable magnification lens 40 moves in the direction of the optical axis L according to driving of the zoom mechanism 36, and changes an angle of view.

The camera body 11 includes, for example, a body control unit 50, a shutter unit 51, a motor driver 52, an image memory 53, an image data processing unit 54, an AF processing unit 55, an LCD driver 56, a card interface (I/F) 57, a diopter value detection unit 58, and a number-of-configurations storage unit 59, which are connected by a bus line 60, in addition to the release switch 14, the solid-state imaging element 21, the rear display unit 22, and the EVF panel 61 described above.

The body control unit 50 includes, for example, a CPU, a ROM in which programs or parameters to be used by the CPU are stored, a RAM (all not illustrated) to be used as a work memory of the CPU. The body control unit 50 controls each unit of the camera body 11 and the interchangeable lens 12 connected to the camera body 11. The S1 signal and the S2 signal are input from the release switch 14 to the body control unit 50. Further, the body side signal contact 19A is connected to the body control unit 50.

The body control unit 50 transmits a control signal for moving the focus lens 39 to the lens control unit 31 according to the information on a rotation direction and the amount of rotation of the focus ring 27 detected by the lens control unit 31. The lens control unit 31 controls the motor driver 32 on the basis of the control signal to move the focus lens 39.

The body control unit 50 operates the aperture unit 41 according to the information on a rotational position of the aperture manipulation ring 28 detected by the lens control unit 31 and transmits a control signal for changing an aperture diameter to the lens control unit 31. The lens control unit 31 controls the motor driver 32 on the basis of the control signal from the body control unit 50 and controls the aperture diameter of the aperture unit 41 so that an F number corresponding to the rotational position of the aperture manipulation ring 28 is obtained.

The shutter unit 51 is a so-called focal plane shutter, and is disposed between the mount 19 and the solid-state imaging element 21. The shutter unit 51 is provided to be able to block an optical path between the imaging optical system 26 and the solid-state imaging element 21, and changes between an opened state and a closed state. The shutter unit 51 is in an opened state at the time of capturing a live view image and a movie image. The shutter unit 51 temporarily becomes a closed state from the opened state at the time of capturing a still image. The shutter unit 51 is driven by a shutter motor 62. The motor driver 52 controls driving of the shutter motor 62.

The solid-state imaging element 21 is driven and controlled by the body control unit 50. The solid-state imaging element 21 constitutes the imaging unit together with, for example, the shutter unit 51 and the image data processing unit 54. The imaging unit performs imaging in a state in which the interchangeable lens 12 is mounted on the mount 19. The solid-state imaging element 21 is, for example, a CMOS type image sensor, and includes a light reception surface configured of a plurality of pixels (not illustrated) arranged in a two-dimensional matrix form. Each pixel includes a photoelectric conversion element, and photoelectrically converts a subject image formed on the light reception surface by the interchangeable lens 12 to generate an imaging signal. In addition, the solid-state imaging element 21 has an electronic shutter function, and a shutter speed (charge storage time) can be adjusted.

In addition, the solid-state imaging element 21 includes signal processing circuits (not illustrated) such as a noise removal circuit, an automatic gain controller, and an A/D conversion circuit. The noise removal circuit performs a noise removal process on an imaging signal. The automatic gain controller amplifies a level of the imaging signal to an optimal value. The A/D conversion circuit converts the imaging signal into a digital signal and outputs the digital signal from the solid-state imaging element 21 to the bus line 60. The output signal of the solid-state imaging element 21 is image data (so-called RAW data) having one color signal for each pixel.

The image memory 53 stores the image data for one frame output to the bus line 60. The image data processing unit 54 reads image data for one frame from the image memory 53 and performs known image processing such as matrix calculation, demosaic processing, gamma correction, luminance/color difference conversion, and a resizing process.

The LCD driver 56 sequentially inputs the image data for one frame subjected to the image processing by the image data processing unit 54 to the rear display unit 22. The rear display unit 22 sequentially displays the live view images at constant periods. The card I/F 57 is incorporated in a card slot (not illustrated) provided in the camera body 11, and is electrically connected to a memory card 63 inserted in the card slot. The card I/F 57 stores the image data subjected to image processing by the image data processing unit 54 in the memory card 63. Further, in a case where the image data stored in the memory card 63 is reproduced and displayed, the card I/F 57 reads the image data from the memory card 63.

The finder unit 24 includes a diopter adjustment mechanism 64 and a diopter adjustment lens 65, in addition to the EVF panel 61 and the diopter adjustment dial 24A. The diopter adjustment lens 65 is disposed between the finder eyepiece window 24B and the EVF panel 61. The diopter adjustment mechanism 64 moves the diopter adjustment lens 65 in an optical axis direction in conjunction with a rotation manipulation of the diopter adjustment dial 24A to thereby adjust the diopter value. It should be noted that for the "diopter value" described herein, a diopter value applied in a case where eyesight is on the myopia side is a positive value, a diopter value applied in a case where the eyesight is on the hyperopia side is a negative value, and in a case where the eyesight is normal other than the myopia side and the hyperopia side is 0. Diopter is used as units. In a case where the diopter value is on the negative side, the diopter adjustment lens 65 is moved in a direction for correcting the myopia, and in a case where the diopter value is on the positive side, the diopter adjustment lens 65 is moved in a direction for correcting the hyperopia.

The diopter value detection unit 58 detects the diopter value of the finder unit 24 in a case where the diopter value of the finder unit 24 has been configured. It should be noted that the diopter value detection unit 58 detects a state in which the diopter value has been in the finder unit 24 on condition that a predetermined time has elapsed after the diopter value is selected by the diopter adjustment dial 24A.

Figure 5:
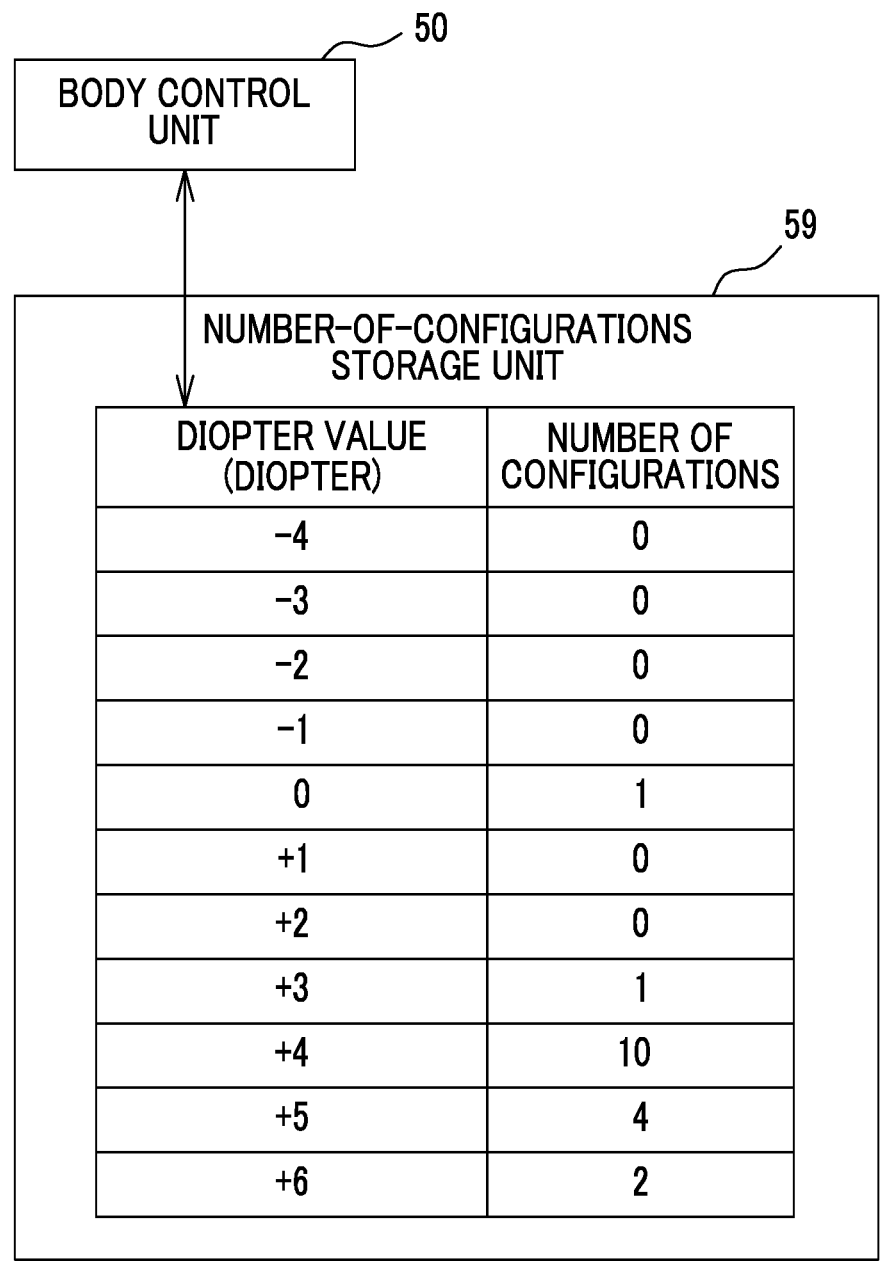
FIG. 5 is a schematic diagram illustrating a configuration in which a number of configurations for each diopter value is counted and stored in a number-of-configurations storage unit.

As illustrated in FIG. 5, the body control unit 50 counts the number of configurations performed by the diopter adjustment dial 24A for each diopter value of the finder unit 24 configured by the diopter adjustment dial 24A, and stores a resultant value in the number-of-configurations storage unit 59. The number-of-configurations storage unit 59 includes, for example, a nonvolatile memory such as an electrically erasable programmable read only memory (EEPROM).

In the example illustrated in FIG. 5, the number of configurations by the diopter adjustment dial 24A is counted in a range of −4 diopter to +6 diopter, which is a range of the diopter value configurable by the diopter adjustment dial 24A, and stored in the number-of-configurations storage unit 59.

In a case where an imaging mode or a configuration mode is selected by manipulation of the manipulation button 23, the body control unit 50 drives and controls the LCD driver 56 so that the configuration screen is displayed on the rear display unit 22. This configuration screen enables a configuration of an imaging function of the imaging unit including the solid-state imaging element 21, the shutter unit 51, the image data processing unit 54, and the like.

The body control unit 50 functions as a configuration screen changing unit. Specifically, in a case where the diopter value of the finder unit 24 has been configured by the diopter adjustment dial 24A, the body control unit 50 changes the configuration screen according to the number of configurations stored in the number-of-configurations storage unit 59.

Further, the body control unit 50 functions as a configuration frequency calculation unit that calculates a configuration frequency indicating the number of configurations with respect to a time on the basis of the number of configurations stored in the number-of-configurations storage unit 59. Examples of this configuration frequency include the number of configurations the diopter value has been configured from a predetermined time to the current time, and the number of configurations the diopter value has been configured from change on the latest date to a current time. In a case where the diopter value of the finder unit 24 is configured by the diopter adjustment dial 24A and the configuration frequency calculated on the basis of the number of configurations stored in the number-of-configurations storage unit 59 is smaller than the predetermined value, the body control unit 50 changes the configuration screen.

Further, in the embodiment, on the hyperopia side, that is, in a case where a diopter value range is a specific range in which the diopter value is equal to or greater than +4 diopters in a range in which the diopter value of the finder unit 24 configured by the diopter adjustment dial 24A can be configured by the diopter adjustment dial 24A, when the configuration frequency is smaller than the predetermined value, the body control unit 50 causes the display of the configuration screen performed by the rear display unit 22 to be erased.

Figure 6:
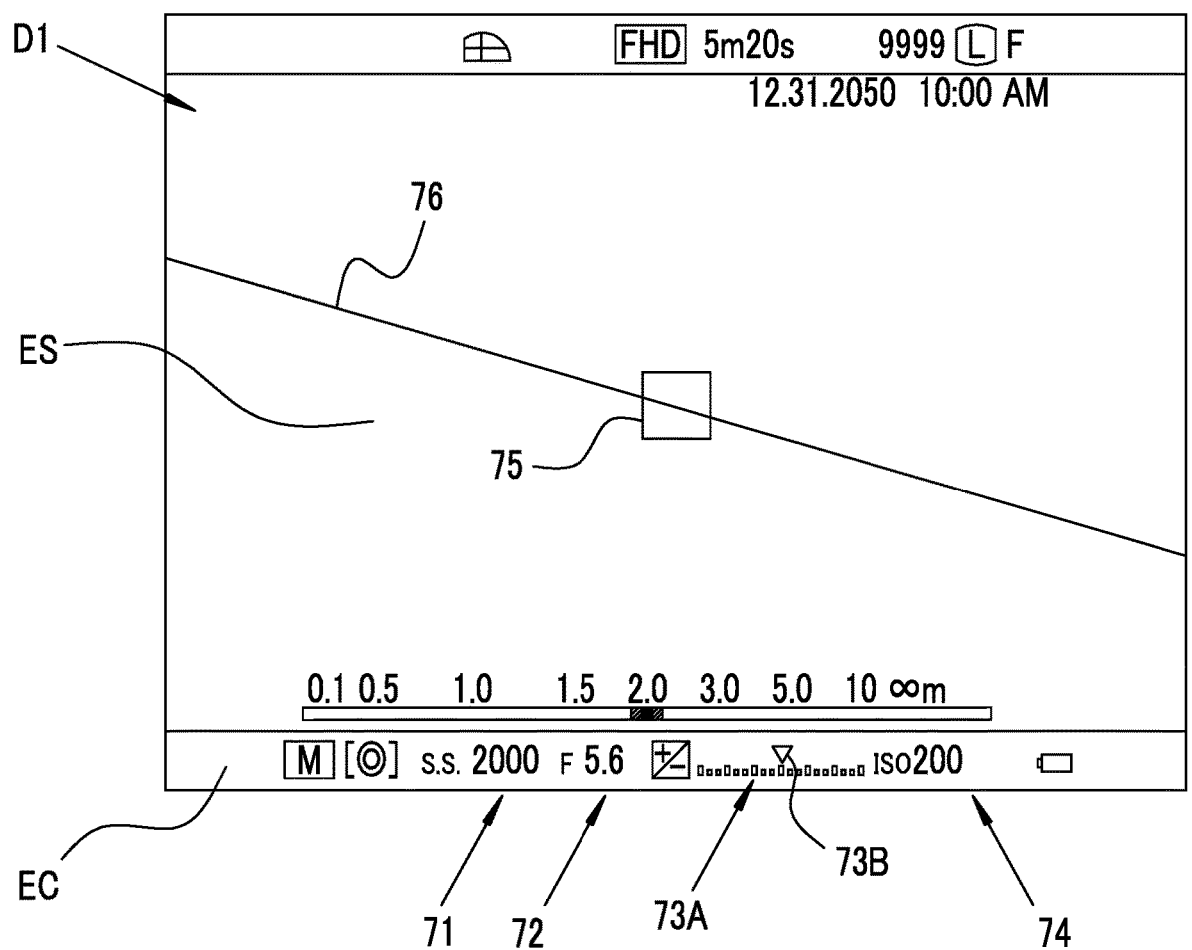
FIG. 6 is an illustrative diagram of a display screen showing an example of a configuration screen.

FIG. 6 illustrates an example of the configuration screen displayed on the rear display unit 22, and illustrates a configuration screen D1 that is displayed in the imaging mode. In the configuration screen D1, a subject display area ES and a configuration display area EC are configured. In the configuration display area EC, a plurality of configuration items such as shutter speed, an F number, an exposure correction value, and an ISO sensitivity are displayed. The subject display area ES is an area in which a live view image can be observed.

In a case where the imaging function is configured on the basis of the configuration screen D1, for example, the shutter speed can be configured by manipulation of the shutter speed/ISO sensitivity dial 16. Reference numeral 71 denotes the shutter speed configured by the manipulation of the shutter speed/ISO sensitivity dial 16.

In a case where the F number is configured, the aperture manipulation ring 28 is manipulated as described above. Reference numeral 72 denotes an F number configured by the manipulation of the aperture manipulation ring 28. Further, in a case where the exposure correction value is configured, the exposure correction dial 15 is manipulated. Reference numeral 73A is a scale for exposure correction. An indicator 73B moves on the scale 73A according to the manipulation of the exposure correction dial 15. Accordingly, the exposure correction value configured by the exposure correction dial 15 is indicated. In a case where the ISO sensitivity is configured, the shutter speed/ISO sensitivity dial 16 is manipulated. Reference numeral 74 indicates the ISO sensitivity configured by the manipulation of the shutter speed/ISO sensitivity dial 16.

In the subject display area ES, a frame 75 indicating a focus area, a tilt indication line 76 for displaying a slope of the camera body 11, and imaging information such as a date, time, the number of captured images, an imaging distance, a depth of field, a shutter scheme, and a moving image mode are displayed.

Figure 7:
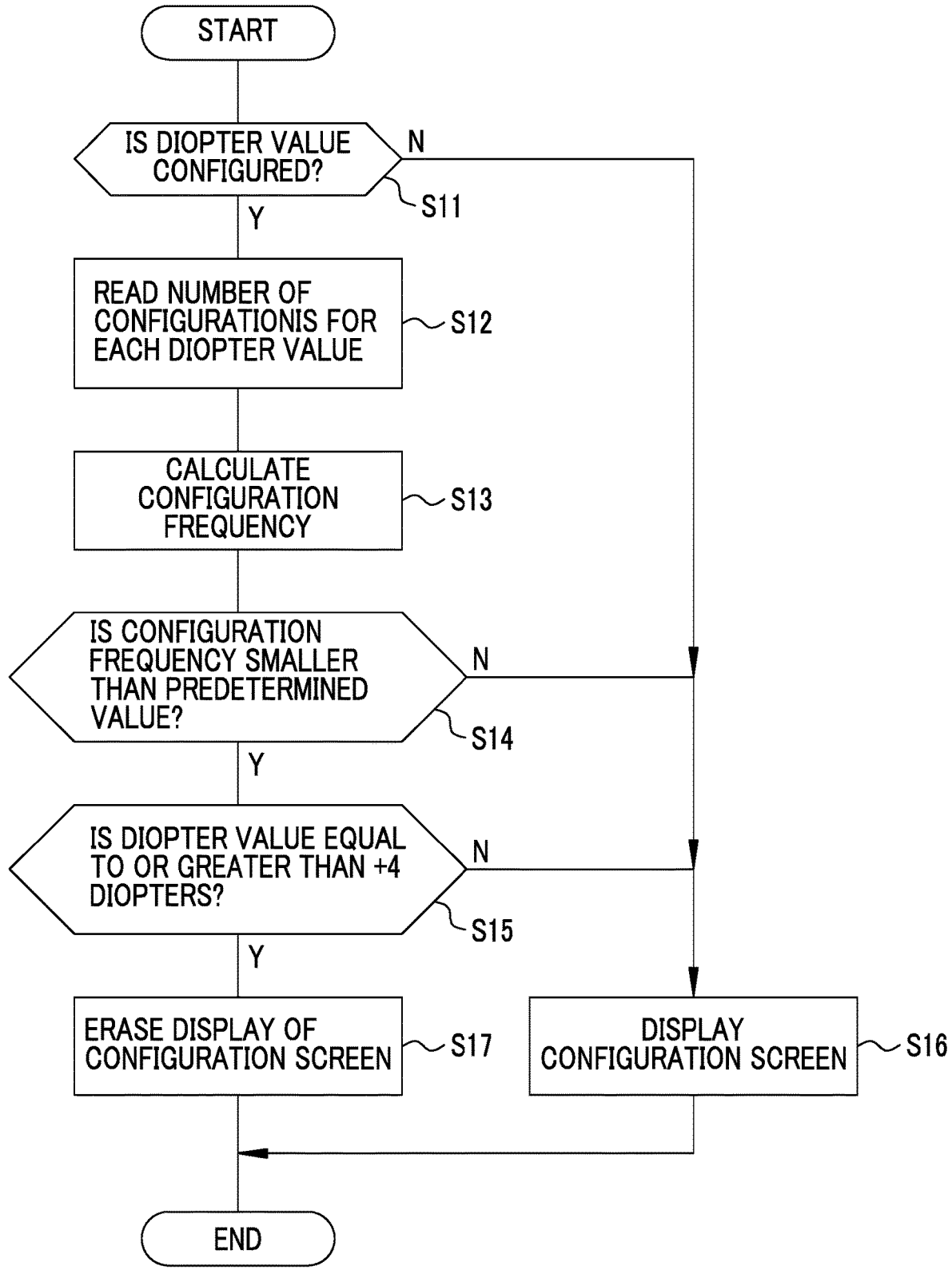
FIG. 7 is a flowchart illustrating a process of changing the configuration screen.

A processing procedure for changing the configuration screen on the basis of the number of configurations stored in the number-of-configurations storage unit 59 in a case where the diopter value of the finder unit 24 is configured will be described along a flowchart illustrated in FIG. 7. It should be noted that in the example illustrated in FIG. 7, an initial configuration in which the configuration screen D1 is displayed is performed before the diopter value of the finder unit 24 is configured.

In a case where the diopter value is configured by the diopter adjustment dial 24A in the imaging mode of the camera 10 (Y in S11), the body control unit 50 reads the number of configurations for each diopter value from the number-of-configurations storage unit 59 (S12). In a case where the diopter value is not configured (N in S11), the configuration screen is not changed. That is, the configuration screen D1 is still displayed on the rear display unit 22 (S16).

Next, the configuration frequency is calculated from the read number of configurations for each diopter value (S13), and a determination is made whether or not the configuration frequency is smaller than a predetermined value (S14). In a case where the configuration frequency is smaller than the predetermined value (Y in S14), the process proceeds to a determination as to whether or not the configured diopter value is equal to or greater than +4 diopters, which is a specific range (S15). In a case where the configuration frequency is not equal to or greater than the predetermined value (N in S14), the configuration screen is not changed (S16).

In a case where the configured diopter value is equal to or greater than +4 diopters (Y in S15), the configuration screen is changed. In the embodiment, the display of the configuration screen D1 displayed on the rear display unit 22 as an initial configuration is erased (S17). On the other hand, in a case where the configured diopter value is smaller than +4 diopters (N in S15), the configuration screen is not changed (S16).

Particularly, it is difficult for a hyperopic photographer of which the diopter value is equal to or greater than +4 diopters among photographers who use the camera 10 to view information and it is preferable for the hyperopic photographer to concentrate on observation of the subject image using the finder unit 24 rather than the display of the configuration screen D1 of which the use is not good. Therefore, the display of the configuration screen D1 is erased as described above. Therefore, the camera 10 can appropriately change the display content of the configuration screen according to the eyesight of the photographer.

On the other hand, in a case where the configuration frequency of the diopter value is equal to or greater than the predetermined value, for example, in a case where another person who is not a main photographer frequently configures the diopter value of the finder unit 24, it is not necessary for the display content of the configuration screen D1 to be changed, and therefore, the configuration screen D1 is kept displayed.

Figure 8:
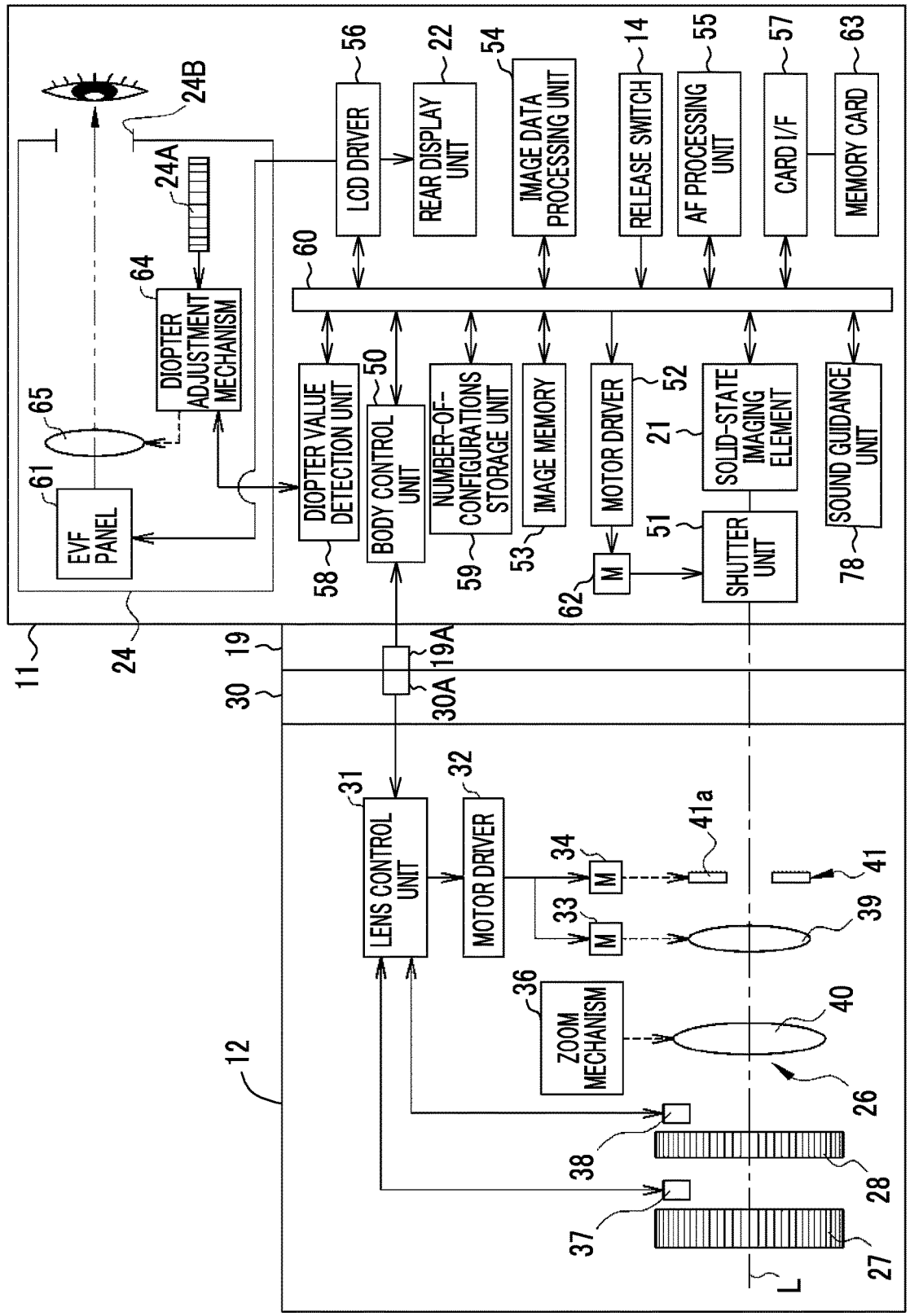
FIG. 8 is a block diagram illustrating a configuration of a modification example of the first embodiment.

As a modification example of the first embodiment, an example in which an imaging function of the imaging unit is guided using sound in a case where the configuration screen is changed will be described. In this modification example, a camera body 11 includes a sound guidance unit 78, as illustrated in FIG. 8. The same components as those of the first embodiment are denoted by the same reference numerals, and repeated description will be omitted. The sound guidance unit 78 includes, for example, a speaker, and a sound signal processing unit.

The sound guidance unit 78 guides the imaging function of the imaging unit using sound. For example, the sound guidance unit 78 notifies a photographer of information on a shutter speed, an F number, an exposure correction value, ISO sensitivity, or the like configured in the camera 10 using sound.

On the hyperopia side, that is, in a case where a diopter value range is a specific range in which the diopter value is equal to or greater than +4 diopters in a range in which the diopter value of the finder unit 24 configured by the diopter adjustment dial 24A can be configured by the diopter adjustment dial 24A and a case where the configuration frequency is smaller than the predetermined value, the body control unit 50 causes the display of the configuration screen performed by the rear display unit 22 to be erased and causes the sound guidance unit 78 to function.

Figure 9:
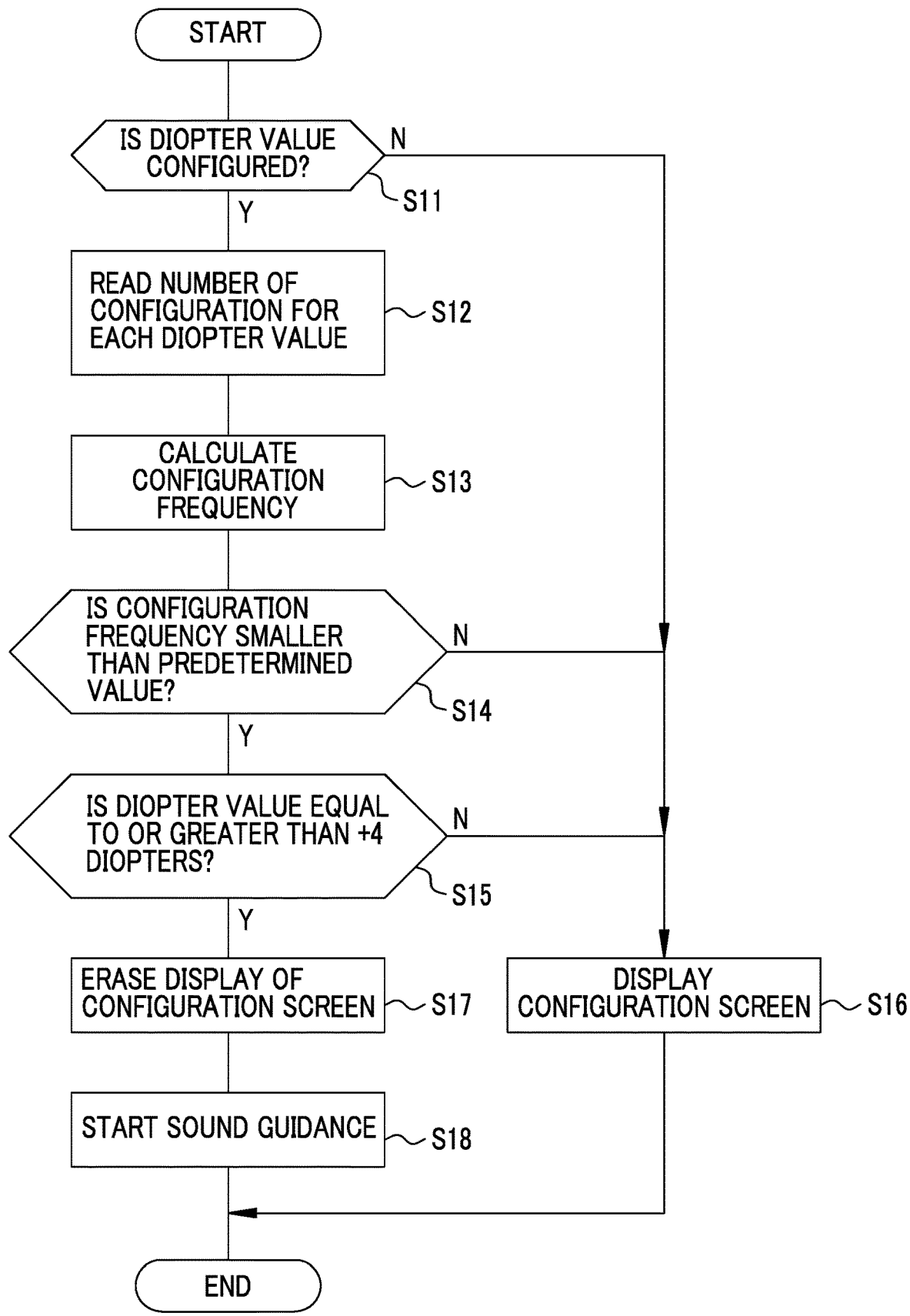
FIG. 9 is a flowchart illustrating a process of changing a configuration screen in a modification example of the first embodiment.

A processing procedure of the modification example in which the sound guidance unit 78 is included will be described with reference to a flowchart illustrated in FIG. 9. In the example illustrated in FIG. 9, an initial configuration in which the configuration screen D1 is displayed is performed before the diopter value of the finder unit 24 is configured.

Similar to the first embodiment, in a case where the diopter value is configured by the diopter adjustment dial 24A in the imaging mode of the camera 10 (Y in S11), the body control unit 50 reads the number of configurations for each diopter value from the number-of configurations storage unit 59 (S12), calculates a configuration frequency from the read number of configurations (S13), and a determination is made whether or not the configuration frequency is smaller than a predetermined value (S14). In a case where the configuration frequency is smaller than the predetermined value (Y in S14), the process proceeds to the determination as to whether or not the configured diopter value is equal to or greater than +4 diopters, which is a specific range (S15).

In a case where the configured diopter value is equal to or greater than +4 diopters (Y in S15), the body control unit 50 changes the configuration screen, that is, erases the display of the configuration screen D1 on the rear display unit 22 (S17), and causes the sound guidance unit 78 to function so that the sound guidance is started (S18). In the case of N in S11, N in S14 and N in S15, the configuration screen is not changed (S16), and the sound guidance unit 78 is not caused to function.

As described above, in a case where the configured diopter value is in the specific range, the display of the configuration screen D1 is erased and the sound guidance unit 78 is caused to function. Therefore, the use is easy for a photographer of the camera 10, particularly, a hyperopic photographer.

Second Embodiment

In the first embodiment, the display of the configuration screen D1 by the rear display unit 22 is erased as the change of the configuration screen, but the present invention is not limited thereto, and in a second embodiment to be described below, information to be displayed as the configuration screen is displayed with a smaller number of characters than that before the change and to be larger than that before the change.

Figure 10:
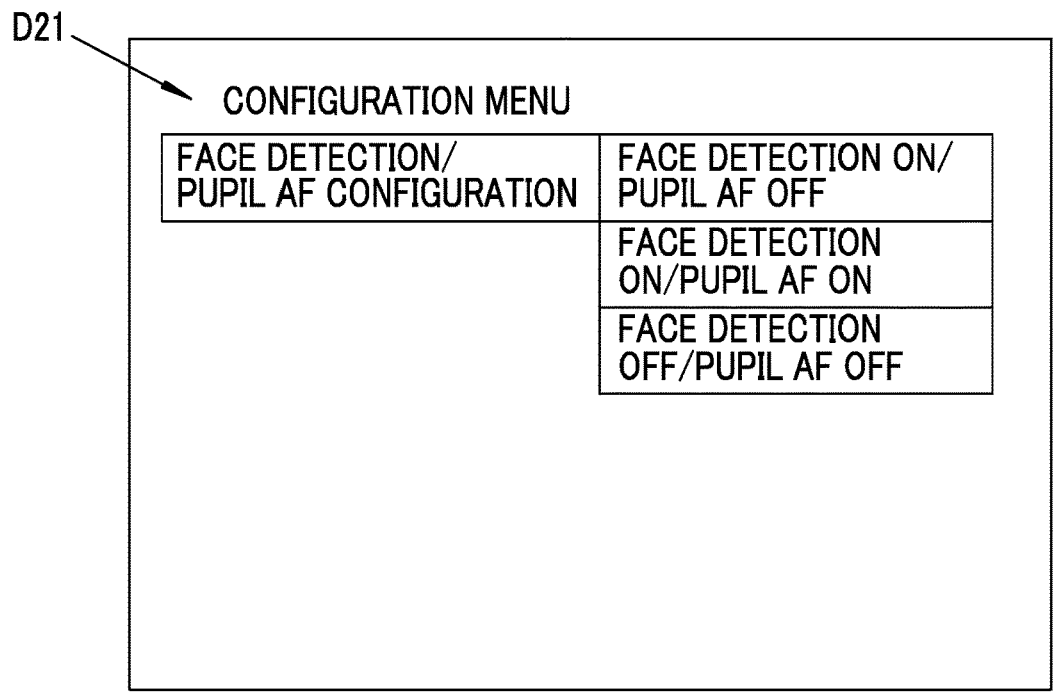
FIG. 10 is an illustrative diagram illustrating an example in which a configuration screen is changed in a second embodiment.
Figure 10:
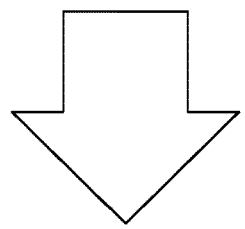
Figure 10:
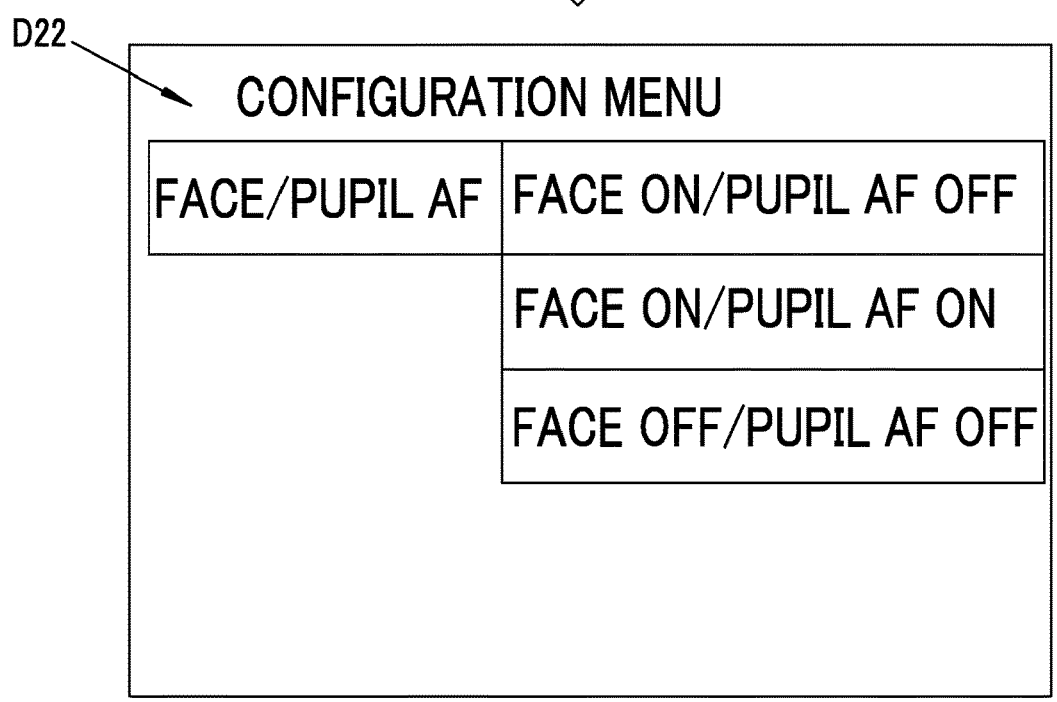

As illustrated in FIG. 10, on the hyperopia side, that is, in a case where a diopter value range is a specific range in which the diopter value is equal to or greater than +4 diopters in a range in which the diopter value of the finder unit 24 configured by the diopter adjustment dial 24A can be configured by the diopter adjustment dial 24A and a case where the configuration frequency is smaller than the predetermined value, the body control unit 50 changes the display of the rear display unit 22 from a configuration screen D21 to a configuration screen D22.

It should be noted that in the embodiment and the following embodiments, a processing procedure such as the determination as to whether or not the configuration frequency is smaller than the predetermined value, and the determination as to whether or not the configured diopter value is in the specific range is the same as that in the first embodiment.

The configuration screens D21 and D22 are examples of configuration menus in which selection candidates for performing face detection/pupil AF configuration are displayed in the configuration mode. In the configuration screen D21, a selection candidate list for face detection/pupil AF configuration including selection candidates such as face detection ON/pupil AF_OFF, face detection ON/pupil AF_ON, and face detection OFF/pupil AF_OFF is displayed. When the face detection ON/pupil AF_OFF is selected from the selection candidate list by a manipulation of the manipulation button 23 or the like, it is possible to detect a face of a person and to focus on the face. In addition, in a case where the face detection ON/pupil AF_ON is selected, it is possible to detect a face of a person and to focus on ae position of an eye. In a case where the face detection OFF/pupil AF_OFF is selected, face detection is not performed.

In a case where the display of the rear display unit 22 has been changed from the configuration screen D21 to the configuration screen D22, information is displayed with a smaller number of characters than that in the configuration screen D21 before the change and to be larger than that in the configuration screen D21 before the change in the configuration screen D22. That is, in the configuration screen D22, the number of characters of the configuration items and all the selection candidates is reduced like "Face/pupil AF" for "Face detection/pupil AF configuration", and each character is displayed to be larger than that in the configuration screen D21.

As described above, in a case where the configured diopter value is in the specific range, the information is displayed with a smaller number of characters than that before the change and to be larger than that before the change, and therefore, it is easy for the photographer of the camera 10, particularly, a hyperopic photographer to view the display content and the use is easy. It should be noted that, as change of the configuration screen, the information of which the number of characters and a size are changed is not limited to the above, and any information to be displayed in the configuration screen may be adopted.

Third Embodiment

Figure 11:
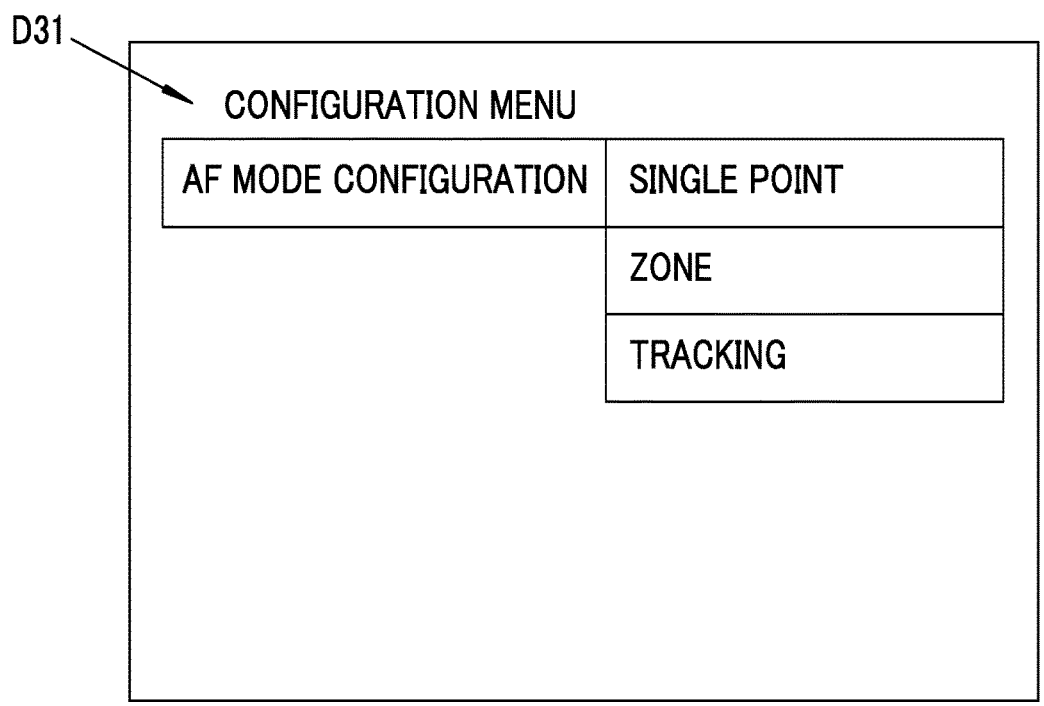
FIG. 11 is an illustrative diagram illustrating an example in which a configuration screen is changed in a third embodiment.
Figure 11:
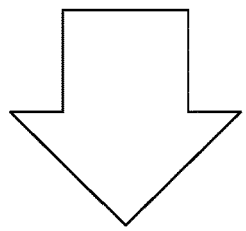
Figure 11:
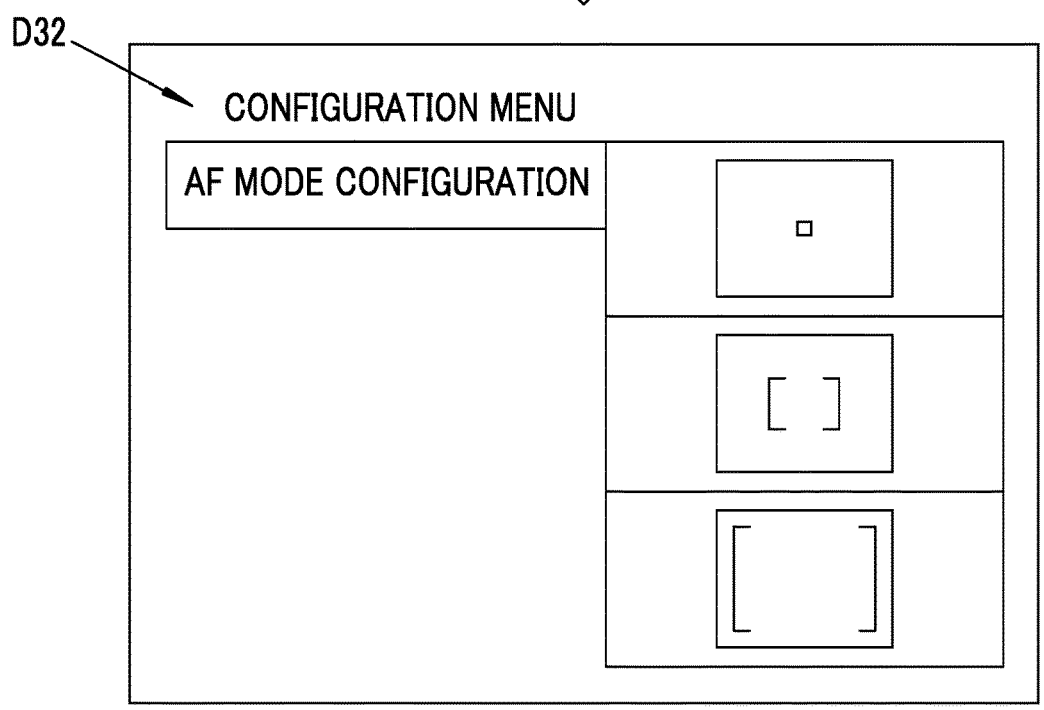

In a third embodiment to be described below, as change of the configuration screen, the content displayed in the configuration screen is changed from text information to an icon. As illustrated in FIG. 11, on the hyperopia side, that is, in a case where a diopter value range is a specific range in which the diopter value is equal to or greater than +4 diopters in a range in which the diopter value of the finder unit 24 configured by the diopter adjustment dial 24A can be configured by the diopter adjustment dial 24A and a case where the configuration frequency is smaller than the predetermined value, the body control unit 50 changes the display of the rear display unit 22 from a configuration screen D31 to a configuration screen D32.

The configuration screens D31 and D32 are examples of configuration menus in which selection candidates for performing an AF mode configuration are displayed in the configuration mode. A list of selection candidates for AF mode configuration including selection candidates such as single point, zone, and tracking is displayed in the configuration screen D31. In a case where the single point is selected from the selection candidate list, a focus area having a narrow range with respect to the subject display area as illustrated in FIG. 6 is configured. Further, in a case where the zone is selected, a focus area having a wider range than the single point is configured. In a case where the tracking is selected, a focus area having a wider range than the zone is configured. When the release switch 14 is halfway pressed, focusing is performed according to a movement of a subject.

As described above, in a case where the display of the rear display unit 22 is changed from the configuration screen D31 to the configuration screen D32, the selection candidates such as the single point, the zone, and the tracking which are text information in the configuration screen D31 is changed to icons in the configuration screen D32. Each icon is designed in a shape and a size representing the focus area. Therefore, it is easy for a photographer of the camera 10, particularly, a hyperopic photographer to view the display content and the use is easy. It should be noted that as change of the configuration screen, information to be changed from the text information to the icon is not limited to the above, and any information displayed in the configuration screen may be adopted.

Fourth Embodiment

Figure 12:
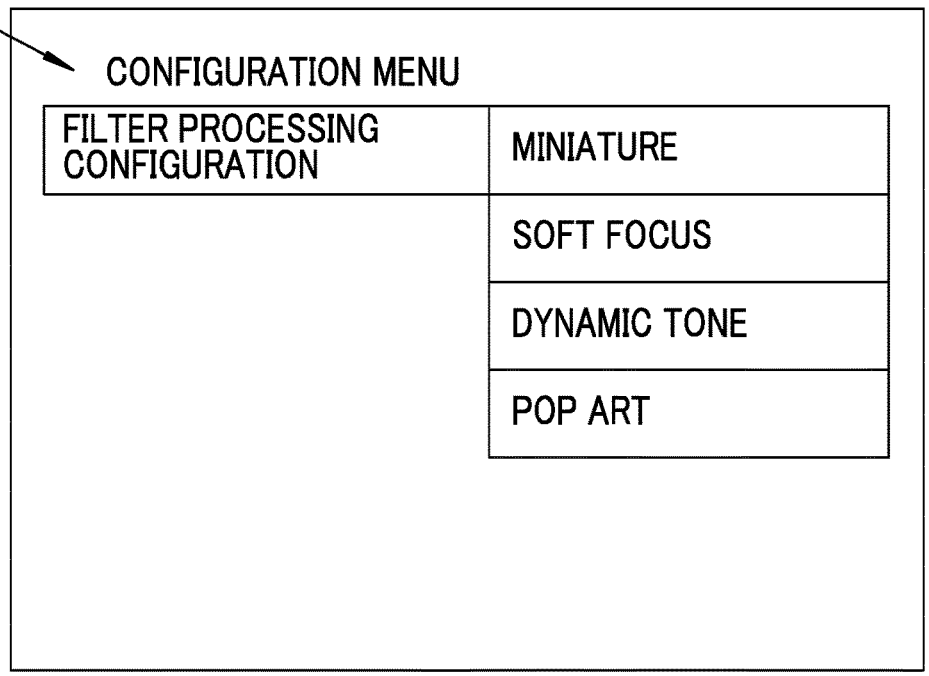
FIG. 12 is an illustrative diagram illustrating an example in which a configuration screen is changed in a fourth embodiment.
Figure 12:
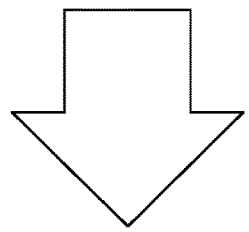
Figure 12:
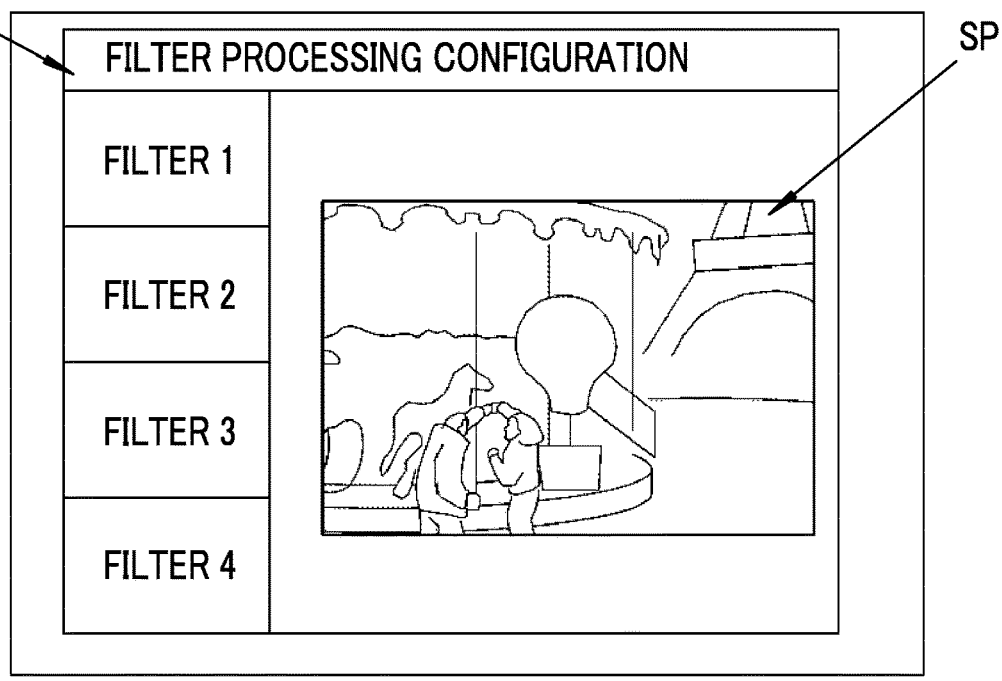

In a fourth embodiment to be described below, as change of the configuration screen, change from text information regarding a filter processing to be performed on a captured image to a sample image corresponding to the filter processing is performed. As illustrated in FIG. 12, on the hyperopia side, that is, in a case where a diopter value range is a specific range in which the diopter value is equal to or greater than +4 diopters in a range in which the diopter value of the finder unit 24 configured by the diopter adjustment dial 24A can be configured by the diopter adjustment dial 24A and a case where the configuration frequency is smaller than the predetermined value, the body control unit 50 changes the display of the rear display unit 22 from a configuration screen D41 to a configuration screen D42.

The configuration screens D41 and D42 are examples of configuration menus in which selection candidates for performing configuration of a filter processing to be performed on the captured image by the imaging unit are displayed in the configuration mode. In the configuration screen D41, a list of selection candidates of the filter processing configuration including selection candidates such as miniature, soft focus, dynamic tone, and pop art is displayed as text information.

In a case where the miniature is selected from the selection candidate list, a process of imaging a miniature is performed while blurring the periphery of an image. Further, in a case where the soft focus is selected, a process of adjusting the amount of blurring of an entire image to create a soft atmosphere is performed. In a case where the dynamic tone is selected, a process of increasing a contrast of an image to create a dynamic atmosphere is performed. In a case where the pop art is selected, a process of increasing a saturation of an image to image a painting is performed.

As described above, in a case where the display of the rear display unit 22 is changed from the configuration screen D41 to the configuration screen D42. The text information on the filter process in the configuration screen D41 is changed to a display of a sample image corresponding to each filter process in the configuration screen D42. That is, filters 1 to 4 in the configuration screen D42 correspond to the miniature, the soft focus, the dynamic tone, and the pop art in the configuration screen D41. In a case where any one of filters 1 to 4 is selected, the sample image SP corresponding to each filter process is displayed in the configuration screen D41. Therefore, it is easy for a photographer of the camera 10, particularly, a hyperopic photographer to view the display content and the use is easy. It should be noted that in the example illustrated in FIG. 12, one sample image is displayed, but the present invention is not limited thereto and a plurality of sample images may be displayed.

Fifth Embodiment

Figure 13:
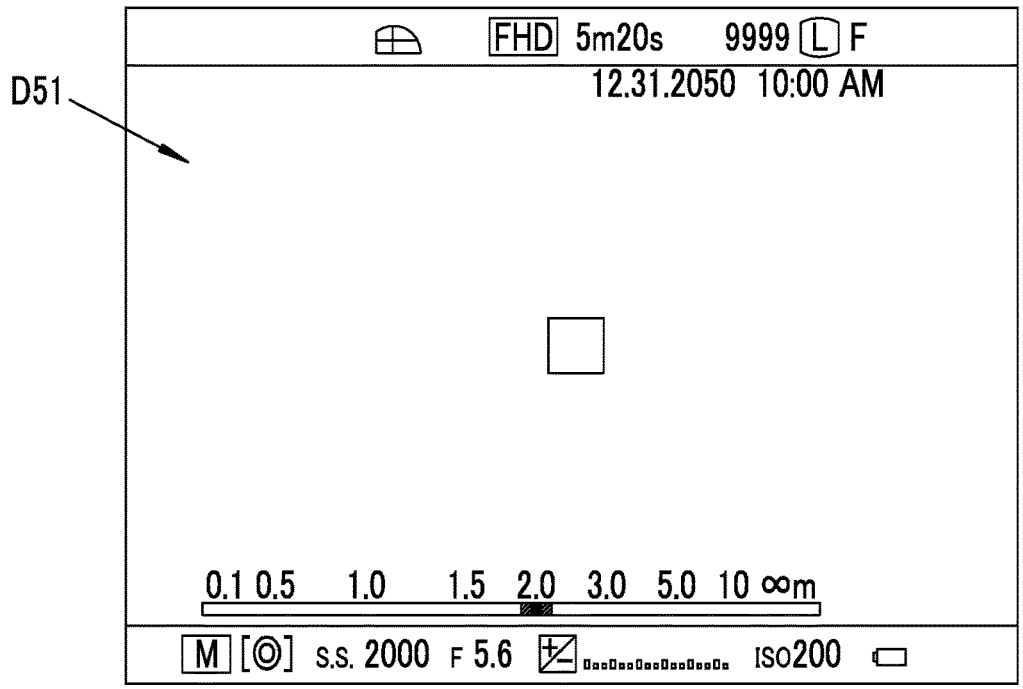
FIG. 13 is an illustrative diagram illustrating an example in which a configuration screen is changed in a fifth embodiment.
Figure 13:
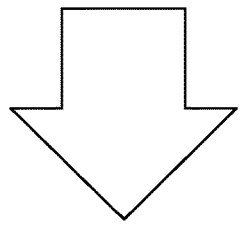
Figure 13:
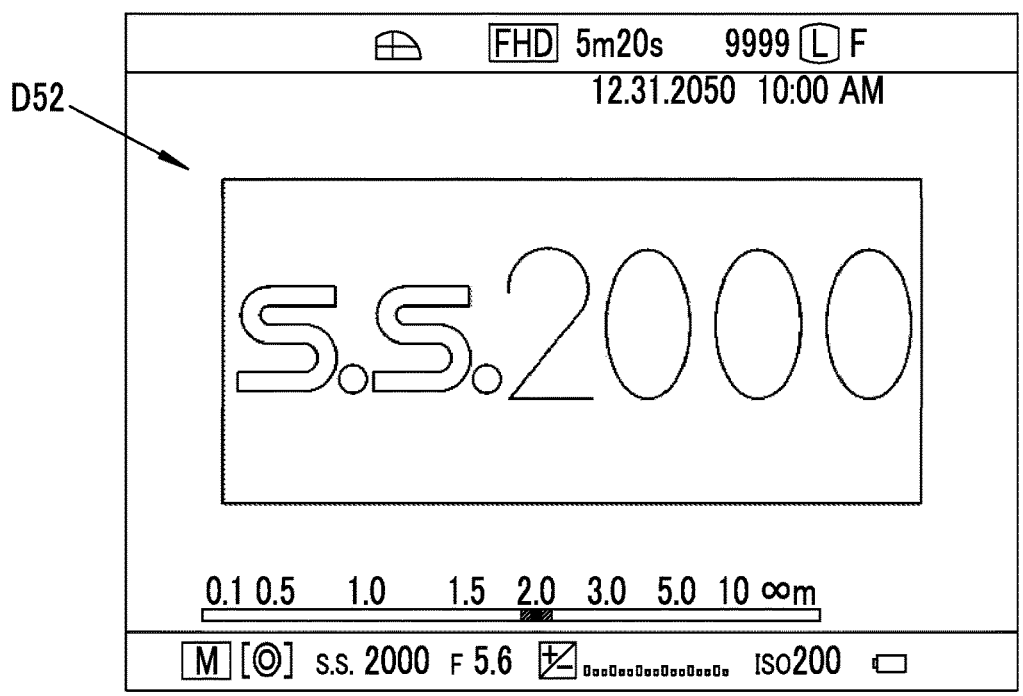

In a fifth embodiment to be described below, as change of the configuration screen, configuration items and configuration values configured on the basis of the configuration screen are enlarged and displayed as compared with before the change. As illustrated in FIG. 13, on the hyperopia side, that is, in a case where a diopter value range is a specific range in which the diopter value is equal to or greater than +4 diopters in a range in which the diopter value of the finder unit 24 configured by the diopter adjustment dial 24A can be configured by the diopter adjustment dial 24A and a case where the configuration frequency is smaller than the predetermined value, the body control unit 50 changes the display of the rear display unit 22 from a configuration screen D51 to a configuration screen D52.

The configuration screens D51 and D52 are configuration screens that are displayed on the rear display unit 22 in the imaging mode. In the configuration screen D51, for example, a configuration item and a configuration value of the shutter speed are displayed, similar to the configuration screen D1 of the first embodiment. It is possible to configure the shutter speed by manipulating the shutter speed/ISO sensitivity dial 16 on the basis of the configuration screen D51, as in the first embodiment.

As described above, in a case where the display of the rear display unit 22 is changed from the configuration screen D51 to the configuration screen D52, the configuration item and the configuration value of the shutter speed are enlarged and displayed in the configuration screen D52, as compared with before the change. In the example illustrated in FIG. 13, the configuration item and the configuration value are displayed in the substantially entire screen of the rear display unit 22. Therefore, it is easy for a photographer of the camera 10, particularly, a hyperopic photographer to view the display content and the use is easy. It should be noted that change may be performed from the configuration screen D51 to the configuration screen D52 and return to the configuration screen D51 may be performed after a predetermined time has elapsed.

Sixth Embodiment

Figure 14:
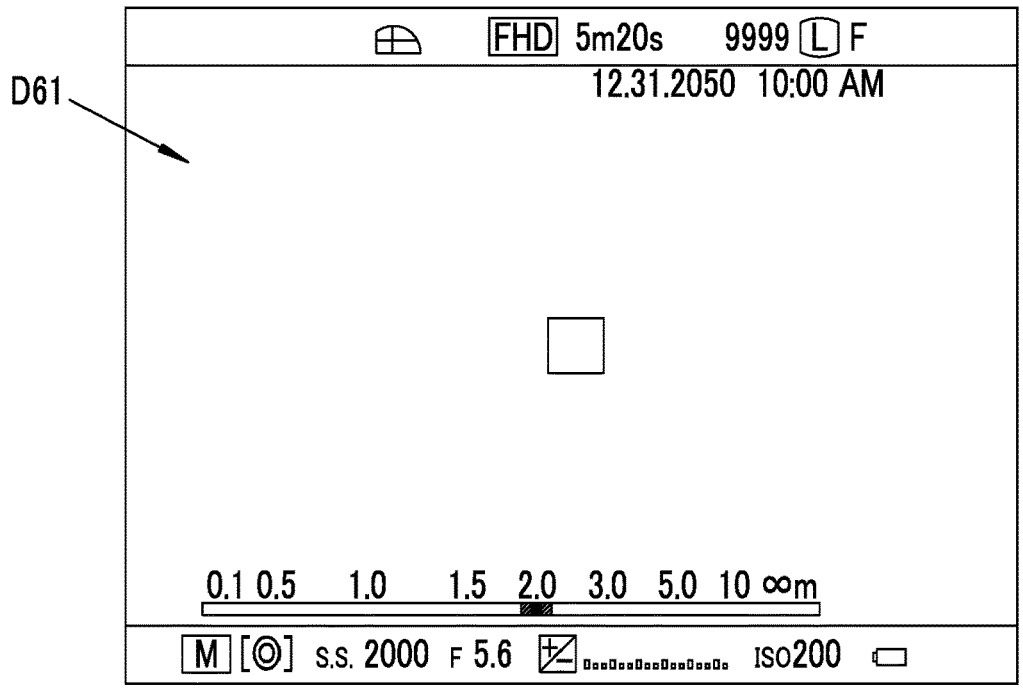
FIG. 14 is an illustrative diagram illustrating an example in which a configuration screen is changed in a sixth embodiment.
Figure 14:
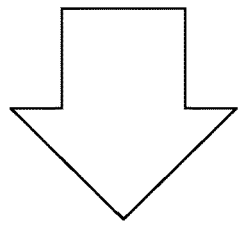
Figure 14:
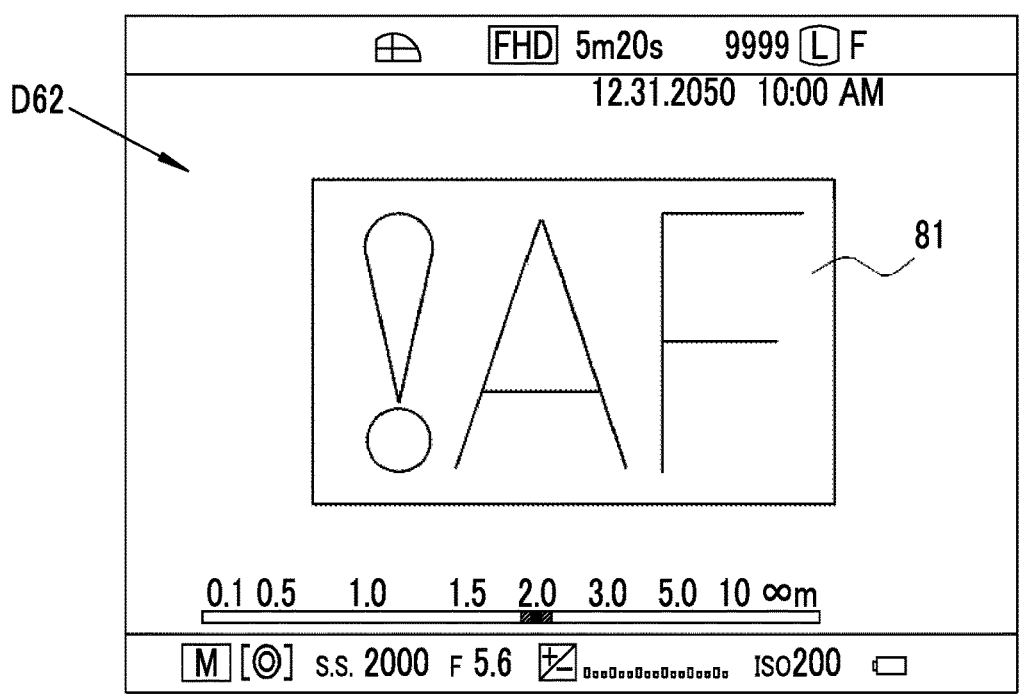

In a sixth embodiment to be described below, as change of the configuration screen, a display for prompting attention to an abnormal manipulation is performed. As illustrated in FIG. 14, on the hyperopia side, that is, in a case where a diopter value range is a specific range in which the diopter value is equal to or greater than +4 diopters in a range in which the diopter value of the finder unit 24 configured by the diopter adjustment dial 24A can be configured by the diopter adjustment dial 24A and a case where the configuration frequency is smaller than the predetermined value, the body control unit 50 changes the display of the rear display unit 22 from a configuration screen D61 to a configuration screen D62.

The configuration screens D61 and D62 are configuration screens that are displayed on the rear display unit 22 in the imaging mode. The configuration screen D61 is the same as the configuration screen D1 in the first embodiment. As described above, in a case where the display of the rear display unit 22 has been changed from the configuration screen D61 to the configuration screen D62, a display for prompting attention to an abnormal manipulation is displayed in the configuration screen D62. Reference numeral 81 denotes a display of an abnormal manipulation regarding autofocus in a manual mode, for example, an abnormal manipulation display indicating that the manipulation is abnormal, for example, in a case where a focus area has been configured. Accordingly, the photographer of the camera 10, particularly, the hyperopic photographer can easily recognize that the abnormal manipulation has been performed.

It should be noted that the abnormal manipulation prompting the attention is not limited to the above, and may be performed, for example, in a case where a continuous imaging configuration has been manipulated in despite of a configuration of a RAW mode in which an image is recorded without compression of captured data or a case where flash emission, ISO sensitivity, an F number, or the like has been manually manipulated in an auto mode in which imaging conditions are automatically configured.

Seventh Embodiment

Figure 15:
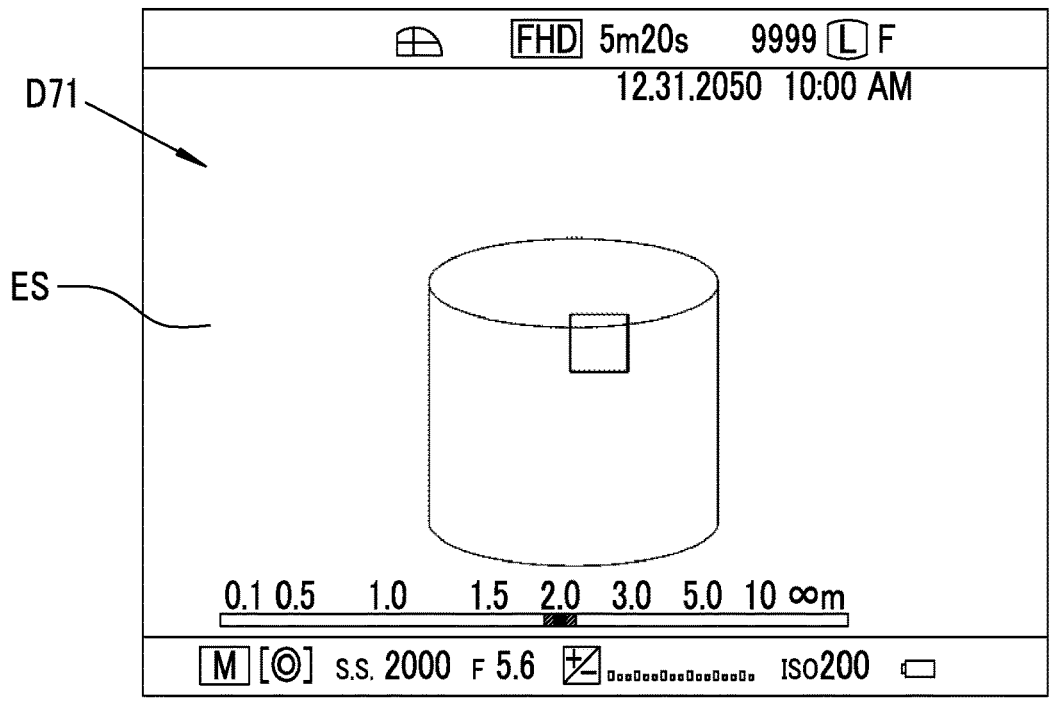
FIG. 15 is an illustrative diagram illustrating an example in which a configuration screen is changed in a seventh embodiment.
Figure 15:
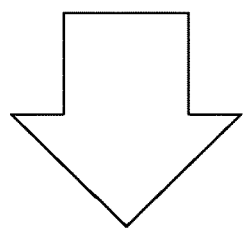
Figure 15:
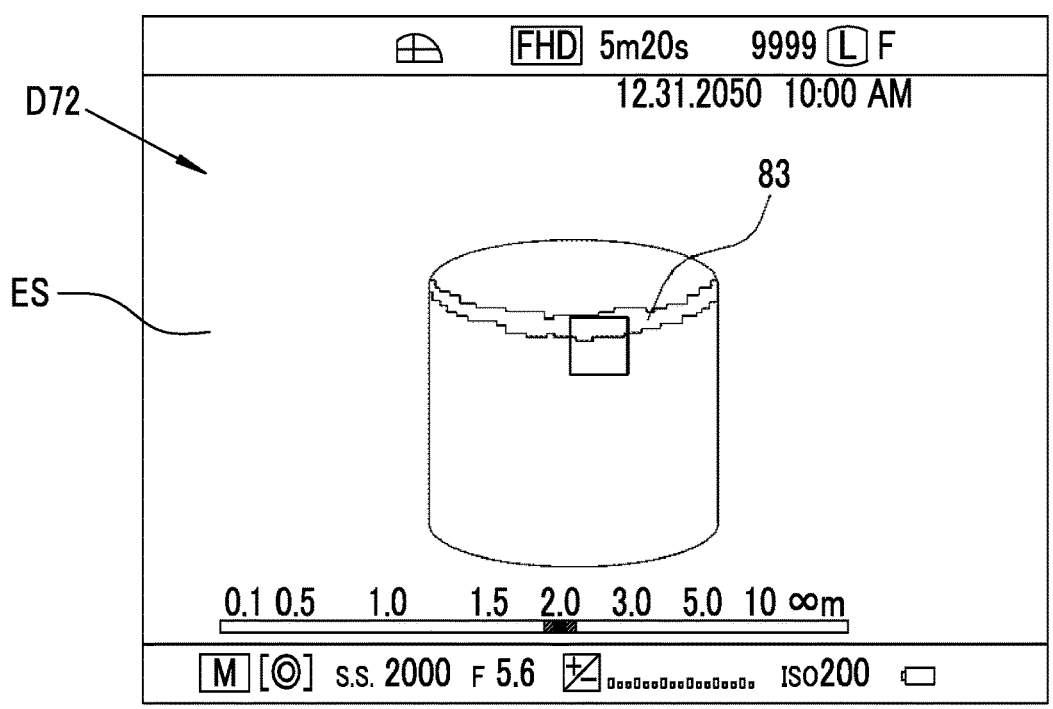

In a seventh embodiment to be described below, as change of the configuration screen, a display is made in which focus peaking at the time of manual focus is made thick. As illustrated in FIG. 15, on the hyperopia side, that is, in a case where a diopter value range is a specific range in which the diopter value is equal to or greater than +4 diopters in a range in which the diopter value of the finder unit 24 configured by the diopter adjustment dial 24A can be configured by the diopter adjustment dial 24A and a case where the configuration frequency is smaller than the predetermined value, the body control unit 50 changes the display of the rear display unit 22 from a configuration screen D71 to a configuration screen D72.

The configuration screens D71 and D72 are configuration screens that are displayed on the rear display unit 22 in the imaging mode and in the manual mode. A live view image that is the subject image captured by the solid-state imaging element 21 is displayed in the subject display area ES of the configuration screen D71, similar to the configuration screen D1 of the first embodiment. In a case where the display of the rear display unit 22 is changed from the configuration screen D71 to the configuration screen D72 as described above, a contour line of a portion focused according to a rotation manipulation of the focus peaking 83, that is, the focus ring 27 is thickly displayed in the configuration screen D72 in a case where the manual focus manipulation is performed. Accordingly, the photographer of the camera 10, particularly, the hyperopic photographer can easily recognize a focus state with respect to the subject image.

Further, the change of the configuration screen for recognizing the focus state is not limited to the above, and a subject image in the focus area may be enlarged and displayed. Further, on the hyperopia side, that is, in a case where a diopter value range is a specific range in which the diopter value is equal to or greater than +4 diopters in a range in which the diopter value of the finder unit 24 configured by the diopter adjustment dial 24A can be configured by the diopter adjustment dial 24A and a case where the configuration frequency is smaller than the predetermined value, it is preferable for the body control unit 50 to enlarge and display the subject image in the focus area, similar to the seventh embodiment.

Eighth Embodiment

In the first to seventh embodiments, the configuration screens to be displayed on the rear display unit 22 in the configuration mode or the imaging mode of the camera 10 are described. On the other hand, an example of a confirmation screen for displaying a plurality of diopter values configured by the diopter adjustment dial 24A and a use frequency based on the number of configurations in a confirmation mode different from the configuration mode and the imaging mode will be described in an eighth embodiment to be described below.

Figures 16, 17:
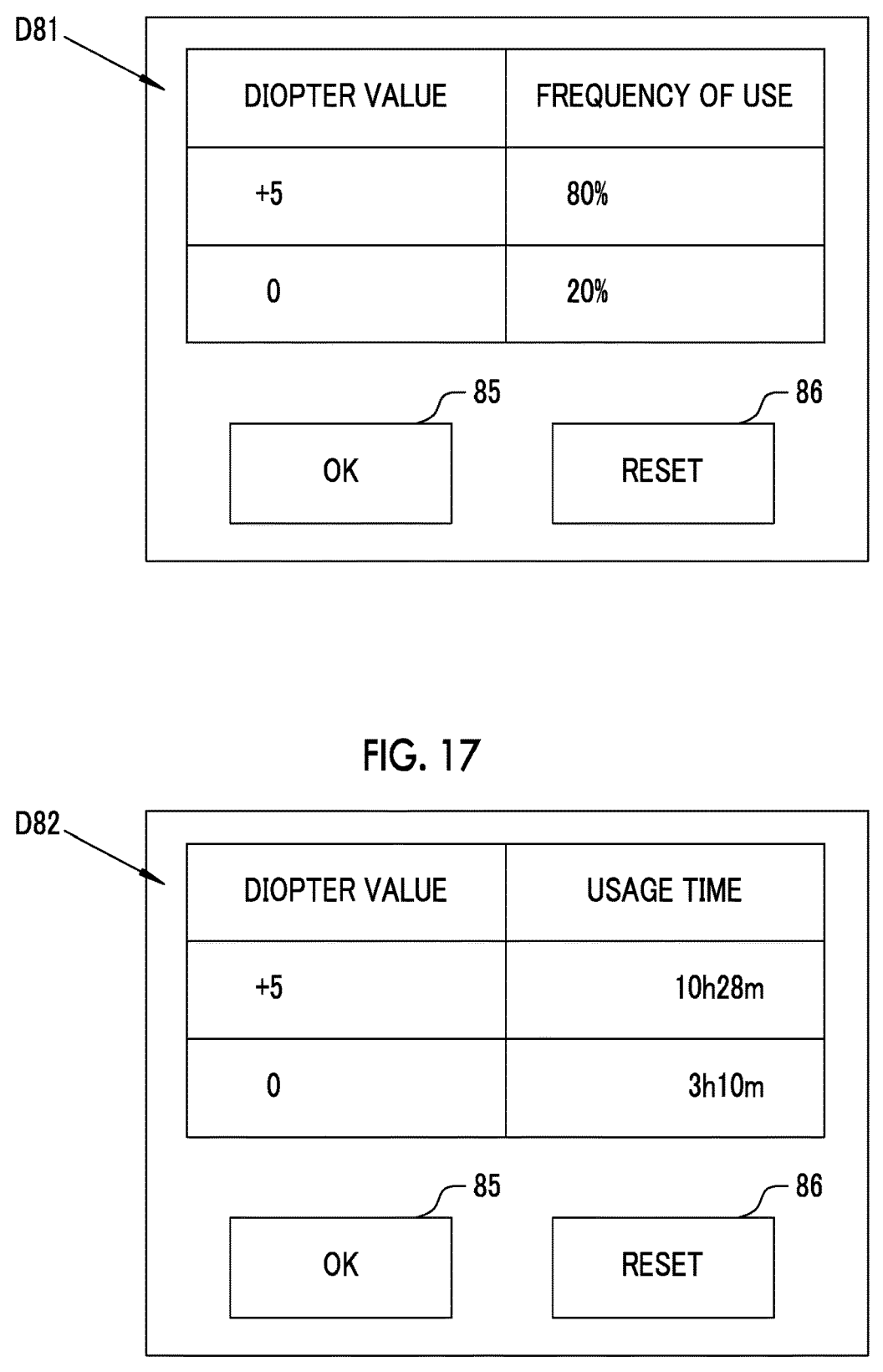

FIG. 16 illustrates an example of a confirmation screen in which the body control unit 50 causes a plurality of diopter values configured by the diopter adjustment dial 24A and a use frequency based on the number of configurations to be displayed on the rear display unit 22 in the confirmation mode. It should be noted that a ratio (%) of the number of configurations for each diopter value to a total number of configurations obtained by totaling the numbers of configurations for the diopter values read from the number-of-configurations storage unit 59 is displayed as the use frequency in the confirmation screen D81. In this case, the body control unit 50 reads the number of configurations for each diopter value from the number-of-configurations storage unit 59, and calculates the use frequency of each diopter value from the read number of configurations for each diopter value. Further, an OK button 85 and a reset button 86 are displayed in the confirmation screen D81. It should be noted that the frequency of use is not limited thereto and may be the number of configurations per predetermined time.

In a case where the confirmation screen D81 is displayed in the confirmation mode, for example, the number of configurations for each diopter value stored in the number-of-configurations storage unit 59 is reset in a case where the reset button 86 is selectively manipulated. Further, in a case where the OK button 85 is selectively manipulated, the display of the confirmation screen D81 ends.

It should be noted that the confirmation screen to be displayed in the confirmation mode is not limited to the above example and a plurality of diopter values configured by the diopter adjustment dial 24A and a use time of each diopter value may be displayed, as in a confirmation screen D82 illustrated in FIG. 17. In this case, the body control unit 50 includes a timer, counts the use time used for each diopter value of the finder unit 24, and stores the use time for each diopter value in the number-of-configurations storage unit 59 or the like.

In each embodiment, the diopter value detection unit 58 detects a state in which the diopter value has been configured in the finder unit 24 on condition that the diopter value is selected by the diopter adjustment dial 24A and then the predetermined time has elapsed, the state in which the diopter value has been configured in the finder unit 24 is not limited thereto, and the diopter value detection unit 58 may detects such a state on condition that the diopter value has been selected and then imaging has been performed or that a manipulation different form the selection of the diopter value has been performed. For example, the diopter value detection unit 58 may detects such a state on condition that information on the diopter value of a user is read in a case where the diopter value is configured, and the diopter adjustment lens is driven to a position according to the information, as described in JP2000-010155A. Alternatively, as described in JP5-183800A (corresponding to U.S. Pat. No. 5,606,390A), pupil information of a user and a diopter value configured by a diopter configuration manipulation unit are stored in association, and in a case where pupil information matching the pupil information of the user is detected, the diopter value stored in association may be read and configured as a new diopter value.

Although the mirrorless single lens type digital camera has been described by way of example in each embodiment, the present invention may be applied to other interchangeable lens type digital cameras such as a single lens reflex type digital camera, and may be applied to a lens-integrated digital camera in which a camera body and a lens barrel are integrally provided.

EXPLANATION OF REFERENCES

10: lens interchangeable type digital camera
11: camera body
12: interchangeable lens
13: power supply lever
14: release switch
15: exposure correction dial
16: shutter speed/ISO sensitivity dial
17: built-in flash device
18: flash lever
19: mount
19A: body side signal contact
21: solid-state imaging element
22: rear display unit
23: manipulation button
24: finder unit
24A: diopter adjustment dial
24B: finder eyepiece window
25: lens barrel portion
26: imaging optical system
27: focus ring 28: aperture manipulation ring
29: zoom ring
30: lens mount
30A: lens side signal contact
31: lens control unit
32: motor driver
33, 34: motor
36: zoom mechanism
37, 38: sensor
39: focus lens
40: variable magnification lens
41 aperture unit
41a: aperture blade
50: body control unit
51: shutter unit
52: motor driver
53: image memory
54: image data processing unit
55: AF processing unit
56: LCD driver
57: card I/F
58: diopter value detection unit
59: number-of-configurations storage unit
60: bus line
61: EVF panel
62: shutter motor
62: memory card
64: diopter adjustment mechanism
65: diopter adjustment lens
71: shutter speed
72: F number
73A: scale
73B: indicator
74: ISO sensitivity
75: frame
76: tilt indication line
78: sound guidance unit
81: abnormal manipulation display
83: focus peaking
85: OK button
86: reset button
D1, D21, D22, D31, D32, D41, D42, D51, D52, D61, D62, D71, D72: configuration screen
D81, D82: confirmation screen
ES: subject display area
EC: configuration display area
SP: sample image

What is claimed is:

1. An imaging device comprising:
an imaging unit that captures a subject image;
a finder unit which enables observation of the subject image and has a variable diopter value;
a diopter configuration manipulation unit that enables a configuration manipulation of the diopter value;
a number-of-configurations storage unit that counts and stores, for each diopter value configured by the diopter configuration manipulation unit, the number of time(s) of each diopter value being configured by the diopter configuration manipulation unit;
a display unit that displays a configuration screen enabling a configuration of an imaging function of the imaging unit; and
a configuration screen changing unit that changes the configuration screen according to the number of configurations stored in the number-of-configurations stor-
age unit in a case where the diopter value has been configured by the diopter configuration manipulation unit.

2. The imaging device according to claim 1, further comprising:
a configuration frequency calculation unit that calculates a configuration frequency indicating the number of configurations with respect to a time on the basis of the number of configurations stored in the number-of-configurations storage unit,
wherein the configuration screen changing unit changes the configuration screen in a case where the diopter value is configured by the diopter configuration manipulation unit and the configuration frequency calculated by the configuration frequency calculation unit is smaller than a predetermined value.

3. The imaging device according to claim 2,
wherein the configuration screen changing unit erases a display of the configuration screen by the display unit in a case where the diopter value configured by the diopter configuration manipulation unit is in a specific range in which the diopter value is equal to or greater than +4 diopters in a range configurable by the diopter configuration manipulation unit and a case where the configuration frequency is smaller than the predetermined value.

4. The imaging device according to claim 3, further comprising:
a sound guidance unit that guides an imaging function of the imaging unit using sound,
wherein the configuration screen changing unit causes the sound guidance unit to function in a case where the diopter value configured by the diopter configuration manipulation unit is in the specific range and the configuration frequency is smaller than a predetermined value.

5. The imaging device according to claim 3,
wherein the configuration screen changing unit causes a display for prompting attention to be displayed in a case where an operation input corresponding to an imaging function different from the imaging function configured on the basis of the configuration screen is performed in a case where the diopter value configured by the diopter configuration manipulation unit is in the specific range and the configuration frequency is smaller than a predetermined value.

6. The imaging device according to claim 3,
wherein the configuration screen changing unit causes a subject image captured by the imaging unit to be displayed on the display unit and causes an outline of a focused portion in the subject image to be displayed thickly with respect to an outline of a non-focused portion in a case where a manual focus manipulation is performed in a case where the diopter value configured by the diopter configuration manipulation unit is in the specific range and the configuration frequency is smaller than the predetermined value.

7. The imaging device according to claim 3,
wherein the display unit displays a confirmation screen for confirming a plurality of diopter values configured by the diopter configuration manipulation unit and a use frequency based on the number of configurations for each of the diopter values.

8. The imaging device according to claim 2,
wherein the configuration screen changing unit displays information to be displayed as the configuration screen with a smaller number of characters than that before the change and to be larger than that before the change in a case where the diopter value configured by the diopter configuration manipulation unit is in a specific range in which the diopter value is equal to or greater than +4 diopters in a range configurable by the diopter configuration manipulation unit and a case where the configuration frequency is smaller than the predetermined value.

9. The imaging device according to claim 2, wherein the configuration screen changing unit changes the content to be displayed as the configuration screen from text information to icons in a case where the diopter value configured by the diopter configuration manipulation unit is in a specific range in which the diopter value is equal to or greater than +4 diopters in a range configurable by the diopter configuration manipulation unit and a case where the configuration frequency is smaller than the predetermined value.

10. The imaging device according to claim 2, wherein the configuration screen changing unit changes the content to be displayed as the configuration screen from text information on filter processing to be performed on a captured image of the imaging unit to a display of a sample image corresponding to the filter processing in a case where the diopter value configured by the diopter configuration manipulation unit is in a specific range in which the diopter value is equal to or greater than +4 diopters in a range configurable by the diopter configuration manipulation unit and a case where the configuration frequency is smaller than the predetermined value.

11. The imaging device according to claim 2, wherein the configuration screen changing unit enlarges and displays a configuration item and a configuration value configured on the basis of the configuration screen as compared with those before the change in a case where the diopter value configured by the diopter configuration manipulation unit is in a specific range in which the diopter value is equal to or greater than +4 diopters in a range configurable by the diopter configuration manipulation unit and a case where the configuration frequency is smaller than the predetermined value.

* * * * *